(12) United States Patent
Hiei et al.

(10) Patent No.: US 9,846,430 B2
(45) Date of Patent: Dec. 19, 2017

(54) VEHICLE CONTROL SYSTEM

(71) Applicant: TOYOTA JIDOSHA KABUSHIKI KAISHA, Toyota-shi, Aichi (JP)

(72) Inventors: Yu Hiei, Toyota (JP); Ryuji Okamura, Gotemba (JP); Ken Kuretake, Mishima (JP); Kotaro Saiki, Susono (JP); Koichiro Yamauchi, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 33 days.

(21) Appl. No.: 14/903,100

(22) PCT Filed: Jun. 25, 2014

(86) PCT No.: PCT/JP2014/067599
§ 371 (c)(1),
(2) Date: Jan. 6, 2016

(87) PCT Pub. No.: WO2015/005185
PCT Pub. Date: Jan. 15, 2015

(65) Prior Publication Data
US 2016/0378104 A1   Dec. 29, 2016

(30) Foreign Application Priority Data

Jul. 11, 2013   (JP) ................... 2013-145678

(51) Int. Cl.
*G05D 1/00* (2006.01)
*B60C 9/00* (2006.01)
(Continued)

(52) U.S. Cl.
CPC ............... *G05D 1/005* (2013.01); *B60C 9/00* (2013.01); *B60T 7/22* (2013.01); *B60T 13/662* (2013.01); *B60T 17/22* (2013.01); *B60T 2201/10* (2013.01)

(58) Field of Classification Search
CPC ............... B60R 2300/806; B60T 17/22; B60T 2201/10; G08G 1/168; B60C 9/00; G05D 1/005
(Continued)

(56) References Cited

U.S. PATENT DOCUMENTS 6,166,631 A    12/2000  Kennedy et al.
6,986,581 B2 *  1/2006  Sun ..................... G03B 21/60
                                                     353/31

(Continued)

FOREIGN PATENT DOCUMENTS

DE   10 2008 051982 A1   6/2009
JP      2006-146811 A     6/2006
JP      2009-025984 A     2/2009

OTHER PUBLICATIONS

International Search Report for PCT/JP2014/067599 dated Jun. 25, 2014 [PCT/ISA/210].

(Continued)

*Primary Examiner* — Gertrude Arthur Jeanglaude
(74) *Attorney, Agent, or Firm* — Sughrue Mion, PLLC

(57) ABSTRACT

A vehicle control system includes: an outside-of-vehicle operation device configured to cause a vehicle to travel operated by an operator from outside of the vehicle, inside of a compartment of the vehicle being isolated from the outside of the vehicle by a vehicle body; an assist instruction device configured to cause the operator to select a travel mode in which the vehicle is allowed to travel by an operation of the outside-of-vehicle operation device; a parking brake operation detector configured to detect an operation of a parking brake; and a warning device configured to issue warning in a compartment to stimulate sense of hearing or sense of sight at the time the travel mode is selected and the operation of the parking brake is detected.

16 Claims, 16 Drawing Sheets

(51) Int. Cl.
*B60T 7/22* (2006.01)
*B60T 13/66* (2006.01)
*B60T 17/22* (2006.01)

(58) Field of Classification Search
USPC ............. 701/2, 36, 70; 340/436, 903, 435
See application file for complete search history.

(56) References Cited

U.S. PATENT DOCUMENTS

| | | | | |
|---|---|---|---|---|
| 7,090,355 B2* | 8/2006 | Liu | ........................ | C09K 11/08 |
| | | | | 348/E9.026 |
| 7,182,467 B2* | 2/2007 | Liu | ..................... | G02B 5/0215 |
| | | | | 353/79 |
| 7,213,923 B2* | 5/2007 | Liu | ........................ | G03B 21/56 |
| | | | | 353/31 |
| 7,460,951 B2* | 12/2008 | Altan | .................... | G01S 13/726 |
| | | | | 340/903 |
| 2009/0111649 A1 | 4/2009 | Hecht et al. | | |
| 2010/0253918 A1* | 10/2010 | Seder | ................... | G01S 13/723 |
| | | | | 353/13 |

OTHER PUBLICATIONS

Written Opinion for PCT/JP2014/067599 dated Jun. 25, 2014 [PCT/ISA/237].

* cited by examiner

FIG.3
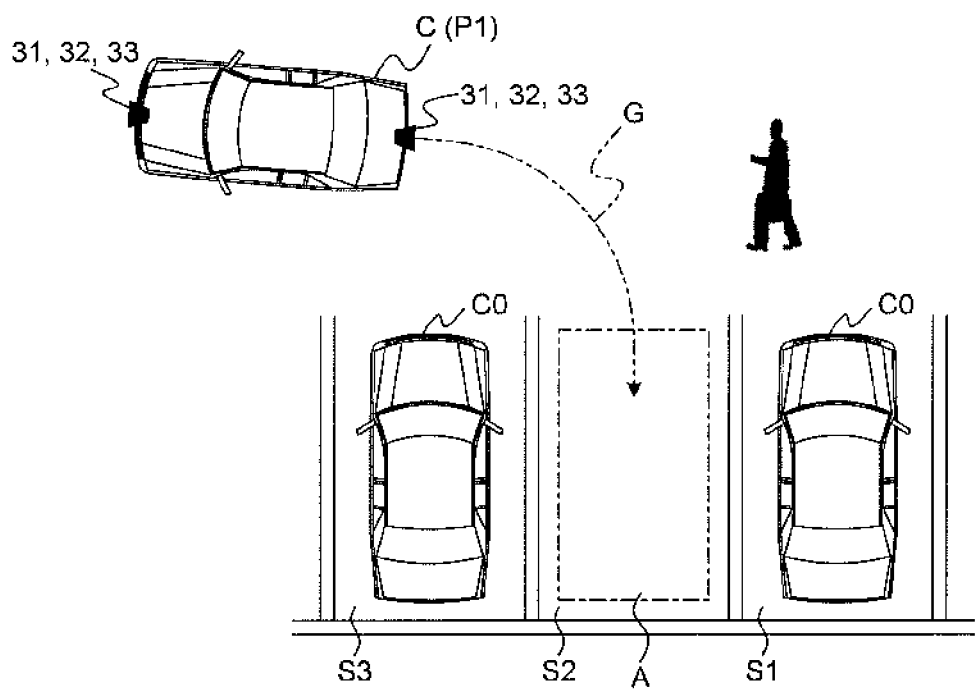
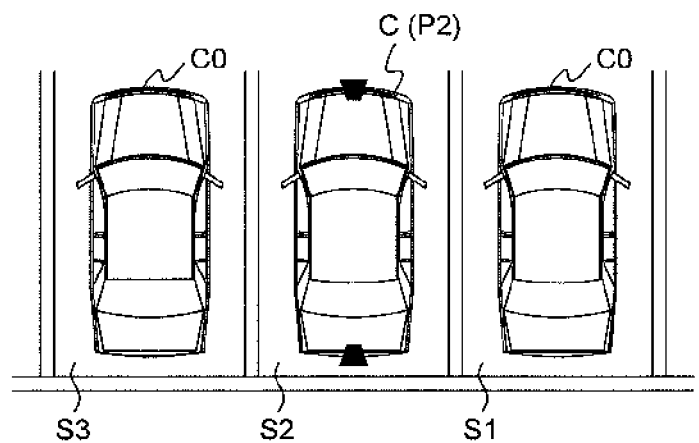

US 9,846,430 B2

VEHICLE CONTROL SYSTEM

CROSS REFERENCE TO RELATED APPLICATIONS

This application is a National Stage of International Application No. PCT/JP2014/067599 filed Jun. 25, 2014, claiming priority based on Japanese Patent Application No. 2013-145678 filed Jul. 11, 2013, the contents of all of which are incorporated herein by reference in their entirety.

TECHNICAL FIELD

The present invention relates to a vehicle control system capable of moving a vehicle by an operation carried out from outside of the vehicle.

BACKGROUND ART

As this type of conventional vehicle control systems, a parking system described in, for example, Patent Literature 1 is known. The parking system causes a vehicle to automatically move to a parking target position depending on the control signal transmitted from a remote controller when a driver having stopped the vehicle gets off the vehicle and operates the remote controller from outside of the vehicle.

CITATION LIST

Patent Literature

Patent Literature 1: Japanese Patent Application Laid-open No. 2006-146811
Patent Literature 2: Japanese Patent Application Laid-open No. 2009-025984

DISCLOSURE OF INVENTION

Problems to be Solved by the Invention

Incidentally, a driver who gets off a vehicle ordinarily operates a parking brake, except in a predetermined condition such as a condition of cold district and the like. For this reason, regardless of that the driver intends to move the vehicle by operating it from outside of it, there is a possibility that the driver gets off the vehicle after having operated the parking brake. In the vehicle operated from outside of the vehicle for movement, the braking force of the parking brake blocks the vehicle from traveling while the parking brake remains in operation. In such a case, even if the vehicle could be moved, there is a possibility that the durability of the parking brake is reduced because the brake is dragged. To cope with the problem, in the vehicle control system, it is required to warn an operator who operates the vehicle from outside of the vehicle.

Patent Literature 2 discloses a carrier warned by turning on a display lamp or outputting a warning sound of a signal horn when an unmanned-drive condition is not established in an unmanned-operation mode (when any one of the condition that an accelerator switch is turned on, a parking switch is turned on, a brake switch is turned on, and a floor switch is turned on (it is detected that a driver sits on a driver's seat) or the condition that a battery stopper switch is turned off (an unlock position of a battery stopper is detected)). Since the signal horn can give the warning sound to the driver on the driver's seat and to a person outside of the vehicle because it is applied to the carrier the inside of a compartment of which is not isolated from the outside thereof by a vehicle body. However, when the signal horn is applied to a vehicle such as a passenger car the inside of a compartment of which is isolated from the outside thereof by a vehicle body, there is a possibility that the warning sound cannot be transmitted to an occupant in the compartment. Since the display lamp is disposed to a rear portion of the carrier, when it is applied to the vehicle such as the passenger car, warning output by turning on a lamp is unlikely to be transmitted to the occupant in the compartment. Further, when the display lamp and the signal horn are applied to the vehicle such as the passenger car, since they issue warning toward outside of the vehicle, useless warning is transmitted to outside of the vehicle regardless of that it is sufficient to transmit the warning only to the occupant in the compartment.

An object of the present invention is to improve the disadvantages of the conventional examples and to provide a vehicle control system capable of issuing warning depending on the position of a subject person to whom the warning must be transmitted.

Solution to the Problems

To achieve above object, a vehicle control system according to the present invention includes an outside-of-vehicle operation device configured to cause a vehicle to travel operated by an operator from outside of the vehicle, inside of a compartment of the vehicle being isolated from the outside of the vehicle by a vehicle body; an assist instruction device configured to cause the operator to select a travel mode in which the vehicle is allowed to travel by an operation of the outside-of-vehicle operation device; a parking brake operation detector configured to detect an operation of a parking brake; and a warning device configured to issue warning in a compartment to stimulate sense of hearing or sense of sight at the time the travel mode is selected and the operation of the parking brake is detected.

Here, it is preferable that the vehicle control system further includes a vehicle getting-off-motion detector configured to detect an motion of the operator for getting off the vehicle from inside of the compartment to outside of the vehicle, wherein the warning device further issues the warning at the time the motion of the operator for getting off the vehicle from inside of the compartment to outside of the vehicle is detected.

Further, it is preferable that when the travel mode is selected, the warning device issues the warning at the time the operation of the parking brake is detected.

Further, it is preferable that the vehicle control system further includes a vehicle getting-off-motion detector configured to detect the motion of the operator for getting off the vehicle from inside of the compartment to outside of the vehicle, wherein, when the travel mode is selected and further the motion of the operator for getting off the vehicle from inside of the compartment to outside of the vehicle is detected, the warning device issues the warning at the time the operation of the parking brake is detected.

Further, it is preferable that the vehicle control system further includes a vehicle getting-off detector configured to detect that the operator has gotten off the vehicle from inside of the compartment to outside of the vehicle, wherein the warning device further issues the warning at the time it is not detected that the operator has gotten off the vehicle from inside of the compartment to outside of the vehicle.

Further, it is preferable that the vehicle control system further includes a vehicle getting-off-motion detector configured to detect a motion of the operator for getting off the vehicle from inside of the compartment to outside of the vehicle, wherein the warning device further issues the warning at the time the motion of the operator for getting off the vehicle from inside of the compartment to outside of the vehicle is not detected.

Further, to achieve above object, a vehicle control system according to the present invention includes an outside-of-vehicle operation device configured to cause a vehicle to travel operated by an operator from outside of the vehicle, inside of a compartment of the vehicle being isolated from the outside of the vehicle by a vehicle body; an assist instruction device configured to cause the operator to select a travel mode in which the vehicle is allowed to travel by an operation of the outside-of-vehicle operation device; a parking brake operation detector configured to detect an operation of a parking brake; a vehicle getting-off detector configured to detect that the operator has gotten off the vehicle from inside of the compartment to outside of the vehicle; and a warning device configured to issue warning outside of the vehicle to stimulate sense of hearing or sense of sight at the time the travel mode is selected, the operation of the parking brake is detected, and it is detected that the operator has gotten off the vehicle from inside of the compartment to outside of the vehicle.

Further, it is preferable that the warning device issues the warning at the time the warning device receives the control signal from the outside-of-vehicle operation device, when the travel mode is selected, when the operation of the parking brake is detected, and when the operator has gotten off the vehicle from inside of the compartment to outside of the vehicle is detected.

Further, to achieve above object, a vehicle control system according to the present invention includes an outside-of-vehicle operation device configured to cause a vehicle to travel operated by an operator from outside of the vehicle, inside of a compartment of the vehicle being isolated from the outside of the vehicle by a vehicle body; an assist instruction device configured to cause the operator to select a travel mode in which the vehicle is allowed to travel by an operation of the outside-of-vehicle operation device; a parking brake operation detector configured to detect an operation of a parking brake; a vehicle getting-off-motion detector configured to detect a motion of the operator for getting off the vehicle from inside of the compartment to outside of the vehicle; a vehicle getting-off detector configured to detect that the operator has gotten off the vehicle from inside of the compartment to outside of the vehicle; a warning mode selection device capable selecting (i) a warning mode for issuing warning in the compartment to stimulate sense of hearing or sense of sight at the time the operation of the parking brake is detected when the travel mode is selected, (ii) a warning mode for issuing warning in the compartment to stimulate sense of hearing or sense of sight when the travel mode is selected, when the operation of the parking brake is detected, and when it is not detected that the operator has gotten off the vehicle from inside of the compartment to outside of the vehicle, (iii) a warning mode for issuing warning in the compartment to stimulate sense of hearing or sense of sight when the travel mode is selected, when the operation of the parking brake is detected, and when the motion of the operator for getting off the vehicle from inside of the compartment to outside of the vehicle is detected, and (iv) a warning mode for issuing warning outside of the vehicle to stimulate sense of hearing or sense of sight when the travel mode is selected, when the operation of the parking brake is detected, and when it is detected that the operator has gotten off the vehicle from inside of the compartment to outside of the vehicle, respectively; and a warning device configured to issue the warning depending on the selected warning mode.

Here, it is preferable that, a vehicle getting-off-motion determining unit that carries out a determination based on the result of detection of the vehicle getting-off-motion detector determines that the operator carries out a motion for getting off the vehicle from inside of the compartment to outside of the vehicle in at least any one of the cases that the vehicle getting-off-motion determining unit that detects (i) a change of a seat belt of a seat of the operator from a worn-state to a non-worn state, (ii) a change of a door through which the operator enters and exits from a closed-state to an open-state, (iii) a shift state of the operator from a sitting-state to a non-sitting state, and (iv) a shift position sensor detects an operation of a range operating unit to a parking range.

Further, it is preferable that the parking brake includes an operating unit that operates the parking brake mechanically coupled with a braking force generating unit that generates a braking force.

Effects of the Invention

When the operator stays in the compartment, the vehicle control system according to the present invention issues warning for prompting the operator to release the parking brake in the compartment, when the operator is going to get off the vehicle from inside of the compartment to outside of the vehicle, the vehicle control system issues warning for prompting the operator to release the parking brake in the compartment, and when the operator has got off the vehicle to outside of the vehicle, the vehicle control system issues warning for prompting the operator to release the parking brake outside of the vehicle.

Specifically, the vehicle control system can issue warning depending on a subject person to whom the warning must be transmitted.

BRIEF DESCRIPTION OF DRAWINGS

FIG. 3 is a view illustrating an example of a drive assist of the vehicle control system;

DESCRIPTION OF EMBODIMENTS

An embodiment of a vehicle control system according to the present invention will be explained below in detail based on the drawings. Note that the present invention is by no means limited by the embodiment.

Embodiment

The embodiment of the vehicle control system according to the present invention will be explained based on FIG. 1 to FIG. 6.

Figure 1:
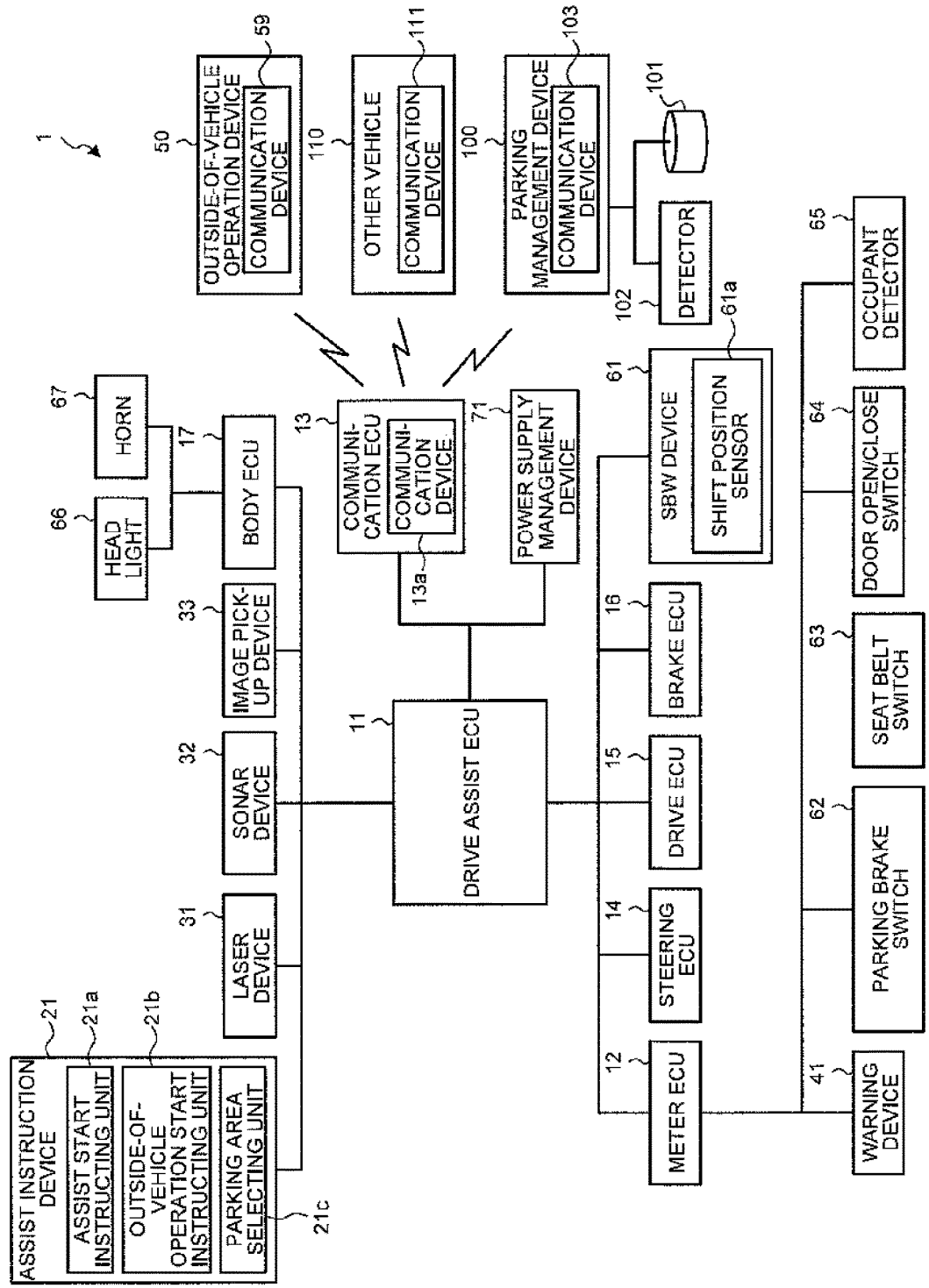
FIG. 1 is a block diagram illustrating a configuration of a vehicle control system according to the present invention.

FIG. 1 is a block diagram illustrating a configuration of a vehicle control system 1 of the embodiment. The vehicle control system 1 is a system for assisting the drive of a vehicle (automobile) by a driver. The vehicle control system 1 is provided with an electronic control unit (hereinafter, called "a drive assist ECU") 11 for carrying out arithmetic processing relating to the drive assist. The drive assist ECU 11 includes a drive assist controller for carrying out control (drive assist control) relating to the following drive assists.

The drive assists are assists when a vehicle is caused to travel from a position at the time and presents, for example, a guide route relating to the travel to the driver together with the moving locus of the vehicle and cause the vehicle to automatically travel along the guide route. The drive assists are carried out when the driver stays in a compartment and will be hereinafter called "an inside-of-compartment drive assist". In the inside-of-compartment drive assist, for example, an assist will be carried out depending on the guide route to the target position of the vehicle after the vehicle has moved. Further, the vehicle control system 1 carries out also a drive assist (hereinafter, called "an outside-of-vehicle drive assist") when the vehicle is operated from outside of the vehicle by an operator such as the driver, in addition to the inside-of-compartment drive assist. The outside-of-vehicle operation is carried out by operating an outside-of-vehicle operation device 50 to be described later by the operator. The outside-of-vehicle operation includes a case that the operator causes the vehicle to travel forward or rearward up to a desired position without setting the target position of the vehicle after the vehicle has moved and a case that the guide route from the position at the time to a set target position is set and the vehicle is caused to travel forward or rearward along the guide route. The outside-of-vehicle drive assist is useful when, for example, an obstacle such as other vehicle exists at a destination in the periphery of a driver's own vehicle and an occupant is unlikely get off from the driver's own vehicle and when a baggage is unlikely to be taken into or taken out from the driver's own vehicle.

The embodiment will be explained exemplifying a parking assist of a vehicle as one of specific examples of the vehicle control system 1. The parking assist can be roughly classified to a parking assist when the driver's own vehicle is parked in a target parking area and to a parking assist when the driver's own vehicle is moved from the parking area. As the inside-of-compartment drive assist (an inside-of-compartment parking assist), the vehicle control system 1 carries out an assist for presenting the guide route from the position at the time to the target parking area together with the moving locus of the vehicle to the driver and an assist for presenting the guide route from the parking area at the time to a target exit position together with the moving locus of the vehicle to the driver. As the inside-of-compartment drive assist, the vehicle control system 1 carries out an assist for parking or moving the vehicle by causing the vehicle to automatically travel along the guide route. Further, as the outside-of-vehicle drive assist (an outside-of-vehicle parking assist), the vehicle control system 1 carries out an assist when the operator such as the driver operates the vehicle from outside of the vehicle and parks the vehicle along the guide route from the position at the time to the target parking area or moves the vehicle along the guide route from the parking area at the time to the target exit position.

On receiving an output signal from an assist instruction device 21, the drive assist ECU 11 can start the arithmetic processing.

The assist instruction device 21 is disposed in the compartment. The assist instruction device 21 includes an instructing unit (hereinafter, called "an assist start instructing unit") 21a operated when the operator such as the driver starts or stops the drive assist control (the parking assist control). On receiving the start or stop signal from the assist start instructing unit 21a, the drive assist ECU 11 starts or stops periphery monitor control together with the inside-of-compartment drive assist control (the inside-of-compartment parking assist control).

Further, the assist instruction device 21 is disposed also with an instructing unit (hereinafter, called "an outside-of-vehicle operation start instructing unit") 21b operated when outside-of-vehicle drive assist control (outside-of-vehicle parking assist control) is started or stopped. On receiving the start signal from outside-of-vehicle operation start instructing unit 21b, in addition to the start signal from the assist start instructing unit 21a, the drive assist ECU 11 starts the outside-of-vehicle drive assist control (the outside-of-vehicle parking assist control). Specifically, the outside-of-vehicle operation start instructing unit 21b of the assist instruction device 21 is an instructing unit that switches a mode to a travel mode (an outside-of-vehicle operation mode) for allowing the vehicle to travel by the operation of the outside-of-vehicle operation device 50. In contrast, on receiving the stop signal from outside-of-vehicle operation start instructing unit 21b, the drive assist ECU 11 stops the outside-of-vehicle drive assist control (the outside-of-vehicle parking assist control).

Although not illustrated, the assist start instructing unit 21a and the outside-of-vehicle operation start instructing unit 21b are, for example, on/off switches disposed on an instrument panel in the compartment, switches on a touch panel of a monitor in the compartment, and the like.

Further, when plural parking area candidates (area candidates acting as the parking targets of the driver's own vehicle) exist, the assist instruction device 21 is provided with a parking area selecting unit 21c for causing the operator such as the driver to select a desired parking area candidate from the area candidates as a target parking area.

When it is recognized that the plural parking area candidates exist, the drive assist ECU 11 causes, for example, the monitor to display the images of the parking area candidates and causes the monitor to display also the selection switches (parking area selecting unit 21c) corresponding to the parking area candidates. When the operator selects a desired parking area candidate by a selection switch on the touch panel of monitor, the drive assist ECU 11 sets the selected parking area candidate as the target parking area. Note that when plural parking area candidates are selected by the operator, the drive assist ECU 11 may cause the operator to select a target parking area under a predetermined condition, for example, a condition that the parking area candidate nearest to the position of the driver's own vehicle position at the time is selected as the target parking area.

The periphery monitor control will be explained here. The periphery monitor control is control for detecting an object in the periphery of the driver's own vehicle and determining whether or not the object is an obstacle of the driver's own vehicle. The drive assist ECU 11 is provided with an object detector for detecting an object in the periphery of the driver's own vehicle and an obstacle determining unit that determines whether or not the detected object is an obstacle of the driver's own vehicle. The object may be a moving object or may be a static object. The moving object is an object in motion such as a vehicle and a bicycle in travel, a pedestrian, and the like. Further, the static object is an object without motion such as a vehicle at rest, a real estate such as a utility pole, a wall, and the like.

The vehicle control system 1 is provided with a periphery information detector for detecting the periphery information of the driver's own vehicle. The periphery information detector can detect at least the periphery information in the travel direction of the driver's own vehicle. Thus, at least one periphery information detector is disposed to each of the front and rear portions of the driver's own vehicle. The periphery information detector disposed to the front portion can preferably detect not only the information in front of the driver's own vehicle but also the information of the sides thereof as far as possible. In contrast, the periphery information detector disposed to the rear portion preferably detects not only the information behind the driver's own vehicle but also the information of the sides thereof as far as possible. When the periphery information detectors are disposed to the front portion and the rear portion and cannot detect the side information of the driver's own vehicle or desired to increase the detectable region of the side information of the driver's own vehicle, the periphery information detectors are preferably disposed also to the right side portion and the left side portion of the driver's own vehicle.

Specifically, as the periphery information detector, a laser device 31, a sonar device 32, and an image pick-up device 33 are used. As the periphery information detector, it is sufficient to dispose at least one of the laser device 31, the sonar device 32, and the image pick-up device 33. The vehicle control system 1 is provided with all of them. Further, the drive assist ECU 11 is provided with a laser beam controller for controlling the following operation of the laser device 31, an ultrasonic wave controller for controlling the following operation of the sonar device 32, and a pick-up controller for controlling the following operation of the image pick-up device 33.

The laser device 31 radiates a laser beam toward the periphery of the driver's own vehicle while scanning the beam. When the laser device 31 is used to detect a peripheral object, for example, the distances from the radiating portion and the receiving portion of the laser beam to the reflecting position of the laser beam (reflection distance) are calculated and the existence of the peripheral object of the driver's own vehicle is recognized based on the information of the reflection distances. The reflection distances can be calculated from the mounting position of the laser device 31 in the vehicle (mainly, the height position of the radiating portion and the receiving portion from a road surface), the scan position of the laser beam (the radiation angle of the laser beam in a vehicle up/down direction and the radiation angle of the laser beam in a horizontal direction), and the time until a reflected beam is received. The arithmetic processing may be carried out by the object detector disposed to the drive assist ECU 11 or may be carried out by an object detector of a dedicated electronic control unit (laser ECU) of the laser device 31 in place of the above object detector. The laser ECU (illustration omitted) may be interposed between the laser device 31 and the drive assist ECU 11 or may be disposed to the laser device 31 and transmit the result of arithmetic processing to the drive assist ECU 11. Further, when the laser ECU is provided, a part of the arithmetic processing relating to the detection of the peripheral object may be carried out by the laser ECU and the remaining arithmetic processing may be carried out by the drive assist ECU 11.

The sonar device 32 radiates an ultrasonic wave toward the periphery of the driver's own vehicle while scanning the wave. When the sonar device 32 is used to detect the peripheral object, for example, the distance from the radiating portion and the receiving portion of the ultrasonic wave to the reflecting position of the ultrasonic wave (reflection distance) is calculated and the existence of the peripheral object of the driver's own vehicle is recognized based on the information of the reflection distance. The reflection distances can be calculated in the same manner as the laser device 31. The arithmetic processing may be carried out by the object detector disposed to the drive assist ECU 11 or may be carried out by an object detector of a dedicated electronic control unit (laser ECU) of the sonar device 32 in place of the above object detector. The sonar ECU (illustration omitted) may be interposed between the sonar device 32 and the drive assist ECU 11 or may be disposed to the sonar device 32 and transmit the result of arithmetic processing to the drive assist ECU 11. Further, when the sonar ECU is provided, a part of the arithmetic processing relating to the detection of the peripheral object may be carried out by the sonar ECU and the remaining arithmetic processing may be carried out by the drive assist ECU 11.

The image pick-up device 33 picks up a motion picture or a still image of the periphery of the driver's own vehicle. The image pick-up device 33 may have a fixed image pick-up range or a variable image pick-up range. The image pick-up device 33 may be, for example, a device for picking up image information in an image pick-up range such as a charge-coupled device (CCD) camera and the like or may be a direct sensor capable of detecting a detection object in an image pick-up range to which the light from the detection object reaches. From the image or the video picture of the periphery picked up by the image pick-up device 33 or from the detected signal relating to the image and the like, at least one of, for example, the color information or the luminance information in the road and the local produce of the periphery of the driver's own vehicle can be detected. For this reason, based on the image, the video picture, or the detected signal of them, the object detector can recognize the existence of the object in the periphery of the driver's own vehicle. The object detector may be disposed to the drive assist ECU 11 or to the dedicated electronic control unit (image pick-up ECU) of the image pick-up device 33. The image pick-up ECU (illustration omitted) may be interposed between the image pick-up device 33 and the drive assist ECU 11 or may be disposed to the image pick-up device 33 and transmit the result of arithmetic processing to the drive assist ECU 11. Further, when the image pick-up ECU is provided, a part of the arithmetic processing relating to the detection of the peripheral object may be carried out by the image pick-up ECU and the remaining arithmetic processing may be carried out by the drive assist ECU 11.

The obstacle determining unit of the drive assist ECU 11 determines whether or not the object detected by the object detector is an obstacle of the driver's own vehicle. For example, the obstacle determining unit determines that an object existing in a predetermined distance in the periphery of the driver's own vehicle is an obstacle. When an object is detected on the guide route of the driver's own vehicle, the obstacle determining unit determines the object as an obstacle. The obstacle determining unit determines an object existing in a parking area as an obstacle. The obstacle determining unit determines an object existing in a region which is a candidate of the guide route of the driver's own vehicle also as an obstacle. Further, the obstacle determining unit determines an object existing in the travel direction of the driver's own vehicle as an obstacle. At the time, when the object is a moving object, the obstacle determining unit determines that the object is a moving obstacle, whereas when the object is a static object, the obstacle determining unit determines that the object is a static obstacle. When the obstacle determining unit identifies whether an object is a moving object or a static object, the determining unit uses the travel information of the driver's own vehicle (a vehicle speed, a steering angle, and the like) together with the information of the object detected by the object detector. Specifically, based on, for example, the vehicle speed of the driver's own vehicle and on the relative speed of an object to the driver's own vehicle, the obstacle determining unit identifies whether the object is the moving object or the static object. When it is determined that an obstacle exists in the periphery of the driver's own vehicle, the vehicle control system 1 can notify the existence of the obstacle to the driver and can issue warning to the driver. For this purpose, the drive assist ECU 11 is provided with a warning controller for carrying out a notification and warning to the driver from a warning device 41 and the like.

The warning device 41 issues warning in the compartment to stimulate the sense of hearing or the sense of sight. The warning device 41 for stimulating the sense of hearing issues a sound or a voice. This type of the warning device 41 is, for example, a warning horn and outputs a buzzer sound. Further, this type of the warning device 41 is, for example, a voice output device and outputs a voice "obstacle ahead" and the like. In contrast, the warning device 41 for stimulating the sense of sight causes the display of the instrument panel, a monitor of a car navigation system (illustration omitted), and the like to display, for example, image and character information thereon. This type of the warning device 41 lights or blinks, for example, an image for recognizing the existence of an obstacle or displays characters showing "obstacle ahead", and the like. The display on the display is carried out by, for example, a meter ECU 12.

The drive assist ECU 11 is provided with a parking area calculating unit that sets a driver's own vehicle target parking area, a driver's own vehicle position calculating unit that calculates a driver's own vehicle position to the parking area, an exit destination calculating unit that determines an exit destination from the driver's own vehicle parking area, and a route creating unit that creates the guide route of the driver's own vehicle when the vehicle parks or moves.

The parking area is a place which has various modes and in which a vehicle can park and may be, for example, a previously prepared place or may be a place determined in view of the relation between the size of the driver's own vehicle and the position of an obstacle. As the former parking area, there are, for example, a place partitioned by a frame line or a dotted line and the like for positioning the front/rear direction and the lateral direction of a vehicle, a place partitioned by two straight lines or dotted lines or ropes for positioning the lateral direction of a vehicle, and a place partitioned by a car stop together with the two straight lines. Further, as the latter parking area, there are, for example, a rectangular region (rectangular parking frame) the use of which is decided when it is determined that the driver's own vehicle can be parked in the region by comparing the space formed between a local produce as an obstacle with the size of the driver's own vehicle, and the like.

The parking area calculating unit recognizes a parking area candidate of the driver's own vehicle based on the obstacle detected by the obstacle determining unit. For example, the parking area calculating unit recognizes, based on the obstacle, a region in which no obstacle such as other vehicle exists as a parking area candidate from parking areas for plural vehicles (for example, the former parking area) or a region (for example, the latter parking area) corresponding to a parking area for plural vehicles. When the parking area candidate is available for only one vehicle, the parking area calculating unit may set the candidate as the target parking area and may prompt the operator such as the driver to move the driver's own vehicle to another place. In contrast, when parking area candidates for plural vehicles exist, the parking area calculating unit causes the selection switches (parking area selecting unit 21c) to be displayed together with the images of the parking area candidates and causes the operator to select the target parking area therefrom as described above.

When the parking area calculating unit recognizes a parking area candidate, the calculating unit may use the management information of a parking place of a parking management device 100 in place of or together with the result of detection of the obstacle determining unit. As the management information, the information of the parking areas in the parking place is used. Specifically, the parking management device 100 has the vacant/occupied information of parking areas (specifically, the information of vacant parking areas and the information of the occupied parking areas). The vacant/occupied information is calculated based on the information of the parking areas of the parking place stored in a database 101 and on the occupied information of the vehicles in the parking areas detected by a detector 102. The parking management device 100 wirelessly transmits the vacant/occupied information of the parking areas to, for example, a vehicle entering into the parking place via a communication device 103. The vehicle is provided with a communication electronic control unit (hereinafter, called "a communication ECU") 13, receives the information from the parking management device 100 via a communication device 13a, and sends the information to the drive assist ECU 11. The parking area calculating unit of the drive assist ECU 11 recognizes the parking area candidate of the driver's own vehicle using the vacant/occupied information of the parking area.

The driver's own vehicle position calculating unit calculates a driver's own vehicle position to the parking area candidate or the target parking area using, for example, the result of image picked up by the image pick-up device 33.

The exit destination calculating unit can determine the exit destination of the driver's own vehicle based on the instruction (the instruction of the exit destination desired by the operator such as turning right and left) issued by the operator from, for example, the touch panel of the monitor, and the like. Further, when the destination of the driver's own vehicle is set by the car navigation system (illustration omitted), the exit destination calculating unit can determine the exit destination of the driver's own vehicle from the parking area in accordance with the guide path.

The route creating unit creates the guide route from the position of the driver's own vehicle at the time to a parking area or the guide route from the parking area of the driver's own vehicle to the exit destination. It is assumed that the guide route of the driver's own vehicle is set so that the obstacle detected by the obstacle determining unit can be avoided. The obstacle to be avoided at the time is a static obstacle. This is because that a moving obstacle has a high probability that it is away from its place. However, when the moving obstacle is continuously detected even if a predetermined time has passed, the guide route of the driver's own vehicle is created to avoid also the moving obstacle. The route creating unit may create the guide route of the driver's own vehicle based on the instruction (the instruction of the guide route desired by driver) issued by the driver via the touch panel and the like.

For example, the drive assist controller displays the guide route on the monitor in the compartment. The driver in the compartment who has received the inside-of-compartment drive assist (the inside-of-compartment parking assist) moves the driver's own vehicle to the target parking area along the guide route by carrying out an accelerator operation, a brake operation, and a steering operation.

When the drive assist controller carries out the inside-of-compartment drive assist (the inside-of-compartment parking assist) independently of that described above, the controller sends a control instruction to a steering ECU 14, a drive ECU 15, and a brake ECU 16 to move the driver's own vehicle to the target parking area along the guide route by causing the vehicle to automatically travel. The automatic travel means to cause the driver's own vehicle to automatically travel using at least one of a steering device, a power source, and a brake device as a control subject and automatically carrying out an operation relating the control subject on a vehicle side. The steering ECU 14 controls the steering device (illustration omitted) of the driver's own vehicle based on the steering angle instructions at the positions on the guide route sent from the drive assist controller and steers a steering wheel. The drive ECU 15 controls the power source (for example, an engine and a rotary machine whose illustration is omitted) of the driver's own vehicle based on the drive force instruction sent from the drive assist controller and causes the power source to output a drive force. The brake ECU 16 controls the brake device of the driver's own vehicle (for example, a hydraulic brake device whose illustration is omitted) based on the braking force instruction sent from the drive assist controller and causes the brake device to output a braking force. In the automatic travel, when the obstacle determining unit detects a moving obstacle and a possibility arises in that the moving obstacle enters into the guide route of the driver's own vehicle, for example, the driver's own vehicle is stopped once. At the time, the existence of other vehicle 110 may be recognized by the inter-vehicle communication carried out between a communication device 111 of the other vehicle 110 and the communication device 13a of the driver's own vehicle.

Further, as described above, the drive assist controller can carry out also the outside-of-vehicle drive assist (the outside-of-vehicle parking assist). On receiving the start signal from outside-of-vehicle operation start instructing unit 21b, the drive assist controller determines whether or not the outside-of-vehicle drive assist can be carried out. When the drive assist controller determines that the outside-of-vehicle drive assist can be carried out, the controller carries out the outside-of-vehicle drive assist when it receives the control signal from the outside-of-vehicle operation device 50, whereas when the drive assist controller determines that the outside-of-vehicle drive assist cannot be carried out, the controller prohibits the travel based on the operation of the outside-of-vehicle operation device 50 and switches the outside-of-vehicle drive assist (the outside-of-vehicle parking assist) to the inside-of-compartment drive assist (the inside-of-compartment parking assist).

When the vehicle is caused to travel from outside of the vehicle, the operator such as the driver operates the outside-of-vehicle operation device 50. The outside-of-vehicle operation device 50 may be a dedicated mobile remote controller or a vehicle key such as a smart key which is provided with the function of the device 50 and is also mobile, likewise. The outside-of-vehicle operation device 50 may be disposed at, for example, a side surface of the vehicle. Further, the outside-of-vehicle operation device 50 may be previously installed in a predetermined place such as a parking place.

Figure 2:
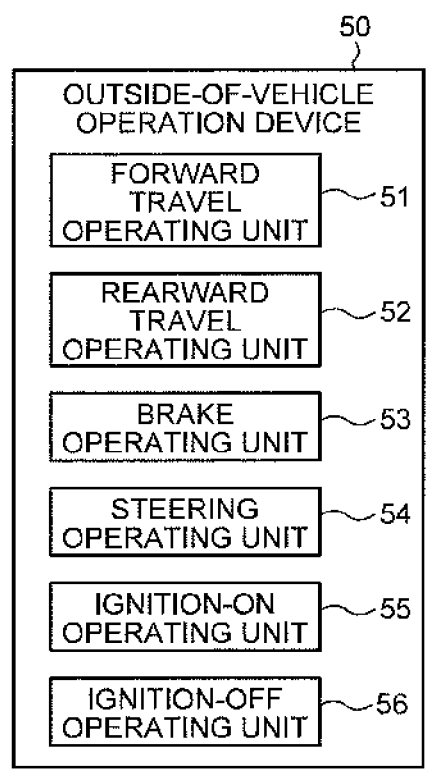
FIG. 2 is a view illustrating an example of an outside-of-vehicle operation device.

As illustrated in FIG. 2, the outside-of-vehicle operation device 50 includes a forward travel operating unit 51, a rearward travel operating unit 52, and a brake operating unit 53. Each of the forward travel operating unit 51, the rearward travel operating unit 52, and the brake operating unit 53 may be composed of an on/off switch. Further, when the outside-of-vehicle operation device 50 includes a touch panel, the forward travel operating unit 51, the rearward travel operating unit 52, and the brake operating unit 53 may be allocated to the switches displayed on the touch panel, respectively.

The forward travel operating unit 51 is an operating unit used to cause the vehicle to travel forward. The operation of the forward travel operating unit 51 corresponds to the accelerator operation carried out in the compartment when a forward range (a so-called D-range) is selected as a shift position in an automatic transmission (illustration omitted). The rearward travel operating unit 52 is an operating unit used to cause the vehicle to travel rearward. The operation of the rearward travel operating unit 52 corresponds to the accelerator operation carried out in the compartment when a rearward range (a so-called R-range) is selected as the shift position in the automatic transmission. For example, when the forward travel operating unit 51 or the rearward travel operating unit 52 is pressed, the outside-of-vehicle operation device 50 outputs a corresponding control signal, whereas when the forward travel operating unit 51 and the rearward travel operating unit 52 are not pressed, the outside-of-vehicle operation device 50 outputs no control signal.

The exemplified vehicle is mounted with a so-called shift by wire device (SBW device) 61 so that the drive assist ECU 11 can automatically switch a gear shift range (a gear shift stage and the like) of the automatic transmission. On receiving the control signal output in association with the operation of the forward travel operating unit 51, the drive assist ECU 11 controls the shift by wire device 61, switches the gear shift range of the automatic transmission to the forward range, and causes the drive ECU 15 to output the drive force from the power source. In contrast, on receiving the control signal output in association with the operation of the rearward travel operating unit 52, the drive assist ECU 11 controls the shift by wire device 61, switches the gear shift range of the automatic transmission to the rearward range, and causes the drive ECU 15 to output the drive force from the power source. In any of the cases, when the brake device outputs the braking force, the drive assist ECU 11 causes the brake ECU 16 to control the brake device and stops the output of the braking force or reduces the braking force. Further, when the drive assist ECU 11 receives no control signal output in association with the operation of the forward travel operating unit 51 and the rearward travel operating unit 52, the drive assist ECU 11 does not cause the power source to output the drive force. Thus, when the drive assist ECU 11 receives no control signal output in association with the operation of the forward travel operating unit 51 and the rearward travel operating unit 52, the drive assist ECU 11 causes the drive ECU 15 to stop the output of the drive force from the power source.

The brake operating unit 53 is an operating unit when a vehicle is stopped or decelerated. The operation of the brake operating unit 53 corresponds to the brake operation in the compartment. When the brake operating unit 53 is pressed, the outside-of-vehicle operation device 50 outputs a corresponding control signal, whereas when the brake operating unit 53 is not pressed, the outside-of-vehicle operation device 50 outputs no control signal. On receiving the control signal output in association with the operation of the brake operating unit 53, the drive assist ECU 11 causes the brake ECU 16 to control the brake device and to output the braking force. Further, on receiving no control signal output in association with the operation of the brake operating unit 53, the drive assist ECU 11 does not cause the brake operating unit 53 to output the braking force.

Note that the forward travel operating unit 51 and the rearward travel operating unit 52 may be configured as an adjustment lever capable of adjusting a throttle opening degree in a similar way that an accelerator opening degree is changed in the compartment. In the case, the magnitude of the drive force can be changed depending on the lever adjustment amount of the forward travel operating unit 51 and the rearward travel operating unit 52. Further, the brake operating unit 53 may be configured as an adjustment lever capable of adjusting the braking force in a similar way that a brake operation amount is changed in the compartment. In the case, the magnitude of the braking force can be changed depending on the lever adjustment amount of the brake operating unit 53.

Further, the exemplified outside-of-vehicle operation device 50 is provided with a steering operating unit 54. The steering operating unit 54 is an operating unit when the steering wheel is steered. The operation of the steering operating unit 54 corresponds to the steering operation in the compartment. On receiving the control signal output in association with the operation of the steering operating unit 54, the drive assist ECU 11 causes the steering ECU 14 to control the steering device and steers the steering wheel depending on the operation amount and the operating direction of the steering operating unit 54.

When any of the operating units is operated, the outside-of-vehicle operation device 50 transmits a signal depending on the operated operating unit via a communication device 59.

The outside-of-vehicle operation device 50 may be provided with at least any one of the assist start instructing unit 21a, outside-of-vehicle operation start instructing unit 21b, and the parking area selecting unit 21c in the assist instruction device 21.

FIG. 3 exemplifies a parking place having parking areas S1 to S3 in which other vehicles CO park in the parking areas S1 and S3, and the parking area S2 is vacant. In the exemplification, the parking area S2 is set as a target parking area A, and a guide route G is set from a position P1 of a driver's own vehicle C at the time to a position P2 in the target parking area A. The operator such as the driver staying outside of the vehicle causes the driver's own vehicle C to travel along the guide route G from the position P1 of the driver's own vehicle by operating the rearward travel operating unit 52 and the steering operating unit 54 of the outside-of-vehicle operation device 50. Thereafter, the operator stops the driver's own vehicle C in the target parking area A by operating the brake operating unit 53. Note that, taking the case that the steering operation in the steering operating unit 54 is difficult into consideration, the drive assist controller can also automatically steer the steering wheel along the guide route G by causing the steering ECU 14 to carry out only, for example, the steering operation.

Incidentally, the vehicle is provided with a parking brake (illustration omitted) operated while the vehicle parks. The parking brake exemplified here is a manual parking brake having an operating unit (a so-called side lever and the like in the compartment) for operating the parking brake, the operating unit being mechanically coupled with a braking force generating unit that generates a braking force. In many cases, when a driver gets off the vehicle, the driver operates the parking brake (illustration omitted) to block the free movement of the vehicle. Thus, even if the driver takes it into consideration to cause the vehicle to travel from outside of the vehicle, there is a possibility that the driver may get off the vehicle remaining the parking brake operated by mistake. When the driver carries out the operation for causing the vehicle to travel by the outside-of-vehicle operation device 50 while operating the parking brake, the travel of the vehicle is blocked by the braking force of the parking brake. At the time, even if it is possible to move the vehicle, there is a possibility in the vehicle that the durability of the parking brake is reduced because the brake is dragged.

To overcome the problem, the vehicle control system 1 is configured to prevent the outside-of-vehicle operation from being carried out while operating the parking brake by outputting warning for prompting to release the parking brake.

Specifically, when the outside-of-vehicle operation mode (the travel mode for allowing the travel of the vehicle by operating the outside-of-vehicle operation device 50) is selected, the drive assist ECU 11 causes warning to be issued in the compartment when the operation of the parking brake is detected. The warning device 41 described above is used to issue the warning. When the warning device 41 is a device for stimulating the sense of hearing, the warning device 41 is caused to output a buzzer sound different from, for example, that issued when the obstacle described above is detected. When the warning device 41 is a device for issuing a voice, the warning device 41 is caused to output a voice, for example, "release the parking brake when the outside-of-vehicle operation is carried out". When the warning device 41 is a device for stimulating the sense of sight, for example, character information having the same content as that of the voice is displayed on the display and the like of the instrument panel. Further, when the warning device 41 issues warning by an image, it displays, for example, a display image different from the display image when the parking brake operates ordinarily (the display image displayed on the display of the instrument panel) or blinks the display image when the parking brake ordinarily operates or the periphery of the display image.

There is also a possibility that the driver operates the parking brake when, for example, the vehicle is stopped. To cope with the problem, in the exemplification, warning is issued in the compartment even if the parking brake has been operated.

Figure 4:
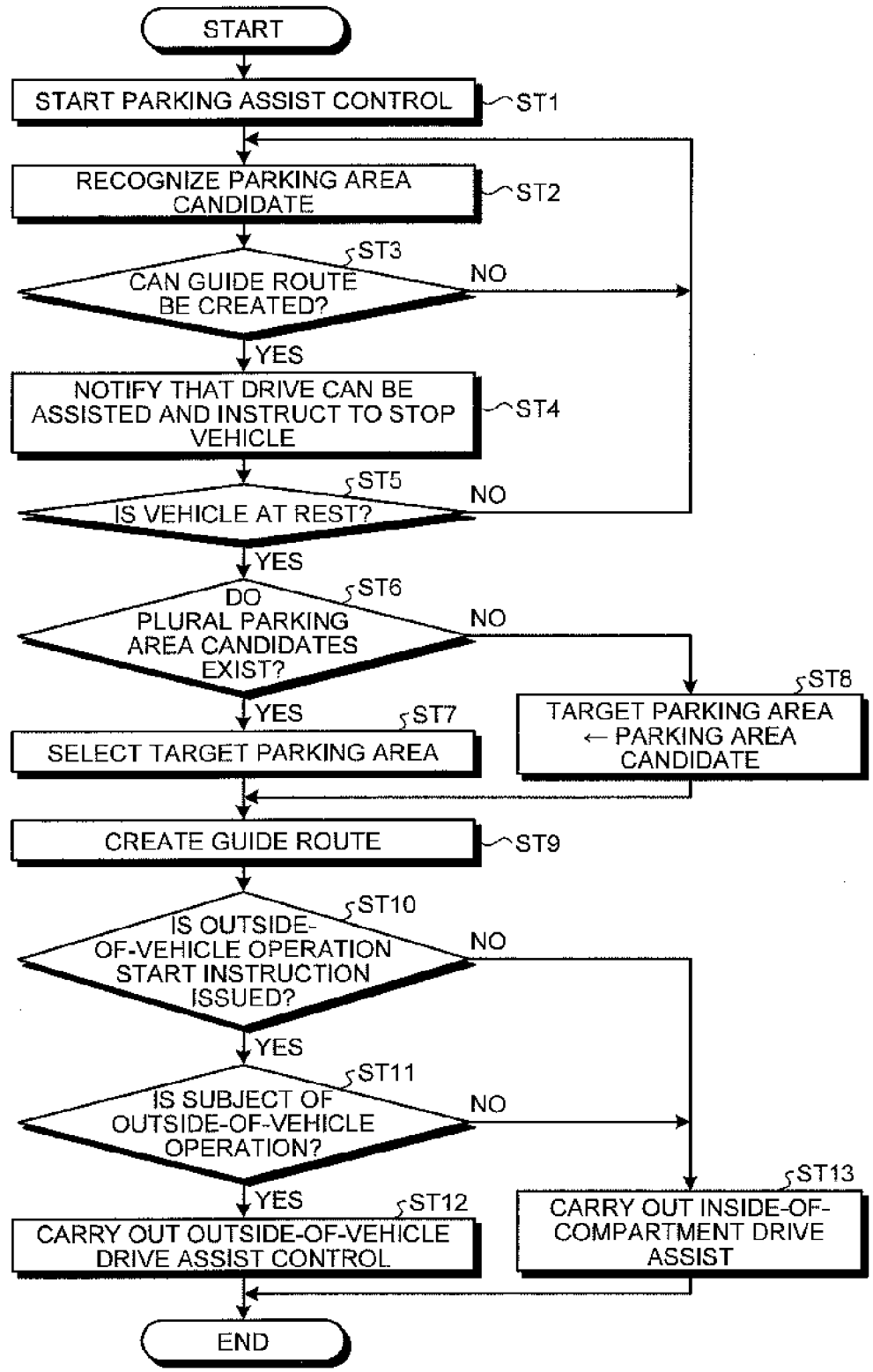
FIG. 4 is a flowchart explaining an arithmetic processing operation in the vehicle control system of the embodiment.
Figure 5:
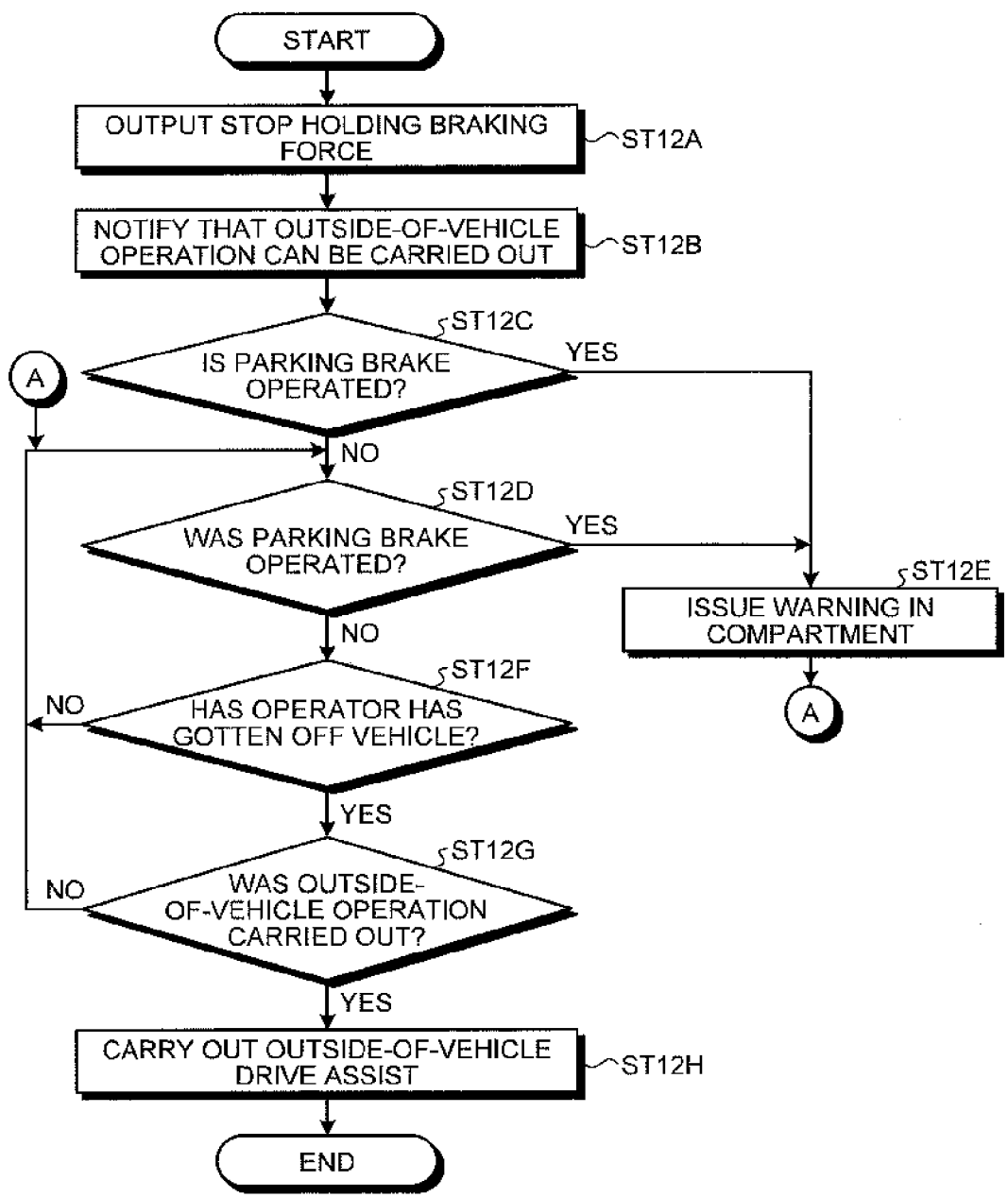
FIG. 5 is a flowchart explaining an arithmetic processing operation of an outside-of-vehicle drive assist in the vehicle control system of the embodiment.

The drive assist control (the parking assist control) including the warning operation will be explained below based on the flowchart of FIG. 4.

On receiving the start signal output in association with the operation of the assist start instructing unit 21*a* of the assist instruction device 21, the drive assist ECU 11 starts the drive assist control (the parking assist control) (step ST1). At step ST1, specifically, the inside-of-compartment drive assist control (the inside-of-compartment parking assist control) and the periphery monitor control start. When the operator (driver) has an intention for carrying out the outside-of-vehicle operation, the operator may operate the outside-of-vehicle operation start instructing unit 21*b* just after the operation of the assist start instructing unit 21*a* or may operate the outside-of-vehicle operation start instructing unit 21*b* after a certain time has passed after the operation of the assist start instructing unit 21*a*. On receiving the start signal output in association with the operation of the outside-of-vehicle operation start instructing unit 21*b*, the drive assist ECU 11 enters the waiting state of the outside-of-vehicle drive assist control (the outside-of-vehicle parking assist control) until it goes to step ST12 to be described later.

The parking area calculating unit of the drive assist ECU 11 recognizes a parking area candidate of the driver's own vehicle (step ST2). As described above, the recognition is carried out using the information of the obstacle detected by the obstacle determining unit and the vacant/occupied information of the parking areas sent from the parking management device 100. At step ST2, the parking area candidate existing in a predetermined range about the position of the driver's own vehicle at the time (for example, the range in which an object can be detected by the laser device 31 and the like) is recognized.

The route creating unit of the drive assist ECU 11 determines whether or not the guide route from the position of the driver's own vehicle at the time to the parking area candidate can be created (step ST3). When, for example, a static obstacle exists between the position of the driver's own vehicle at the time and the parking area candidate and the vehicle cannot move avoiding the static obstacle, the route creating unit determines that the guide route to the parking area candidate cannot be created. When plural parking area candidates are recognized, at step ST3, whether or not the guide route can be created is determined as to each of the parking area candidates. It can be said that the determination at step ST3 is to determine whether or not the recognized parking area candidate can become the target parking area.

When the guide route cannot be created to all the parking area candidates recognized at step ST2, the parking area calculating unit returns to step ST2 and recognizes a parking area candidate of the driver's own vehicle again. At the time, it is preferable to cause the parking area calculating unit to transmit the information, for example, that "since a parking area candidate which can create a guide route within a predetermined angel cannot be found, it is necessary to move the driver's own vehicle from the position at the time" to the driver by the voice information and the character information of the warning device 41.

When, for example, even one parking area candidate capable of creating the guide route exists in all the parking area candidates recognized at step ST2, the drive assist controller of the drive assist ECU 11 transmits the information that "the drive (parking) can be assisted" and "a stop instruction" to the driver (step ST4). For example, the sound information, the voice information, the image information, and the character information output by the warning device 41 are used as the information. Note that when the driver's own vehicle has stopped, "the stop instruction" need not be output.

The parking area calculating unit determines whether or not the driver's own vehicle is at rest (step ST5). The determination is carried out using, for example, the information of a wheel speed, and the like sent from the drive ECU 15. When the driver's own vehicle moves, since there is a possibility that the already recognized parking area candidate cannot be used as the target parking area, the parking area calculating unit returns to step ST2 and recognizes a parking area candidate of the driver's own vehicle again.

When the driver's own vehicle is at rest, the parking area calculating unit determines whether or not plural parking area candidates capable of creating the guide route exist (step ST6).

When the plural parking area candidates exist, the parking area calculating unit selects a target parking area from them (step ST7). At step ST7, as described above, the parking area calculating unit may cause the drive assist ECU 11 to select a target parking area or to display the selection switches (the parking area selecting unit 21*c*) depending on the plural parking area candidates and may cause the driver to select a candidate from the plural candidates.

In contrast, when only one parking area candidate capable of creating the guide route exists, the parking area calculating unit selects the parking area candidate as the target parking area (step ST8).

The route creating unit creates the guide route from the position of the driver's own vehicle at the time to the selected target parking area (step ST9).

The drive assist controller determines whether or not the start signal output in association with the operation of the outside-of-vehicle operation start instructing unit 21*b* is received, specifically, determines whether or not an outside-of-vehicle operation start instruction is issued (step ST10). When the outside-of-vehicle operation start instruction is not issued, the drive assist controller goes to step ST13 and carries out the inside-of-compartment drive assist (the inside-of-compartment parking assist) described above.

When the outside-of-vehicle operation start instruction is issued, the drive assist controller determines whether or not the movement of the driver's own vehicle to the target parking area is the subject of the outside-of-vehicle operation (step ST11). When, for example, obstacles such as a wall, other vehicle, and the like do not exist in the periphery of the target parking area, even if the driver's own vehicle is stopped in the target parking area by driving the vehicle in the compartment, it does not become difficult for an occupant to get off the driver's own vehicle and to take a baggage into and from the vehicle. For this reason, in the case, it can be determined that it is not necessary to dare to drive the driver's own vehicle from outside of the vehicle. Thus, at step ST11, when no obstacle exists in the periphery of the target parking area and an occupant getting on/off property and a baggage taking in/out workability are not deteriorated, it is determined that the movement of the driver's own vehicle to the target parking area is not the subject of the outside-of-vehicle operation. In contrast, when it can be determined that an obstacle exists in the periphery of the target parking area and the occupant getting on/off property and the baggage taking in/out workability are deteriorated, it is determined that the movement of the driver's own vehicle to the target parking area is the subject of the outside-of-vehicle operation. When the drive assist controller determines that the movement of the driver's own vehicle to the target parking area is the subject of the outside-of-vehicle operation, it goes to step ST13 and carries out the inside-of-compartment drive assist (the inside-of-compartment parking assist) described above.

When the drive assist controller determines that the movement of the driver's own vehicle to the target parking area is the subject of the outside-of-vehicle operation, it carries out the outside-of-vehicle drive assist control (the outside-of-vehicle parking assist control) (step ST12). The outside-of-vehicle drive assist control (the outside-of-vehicle parking assist control) will be explained based on the flowchart of FIG. 5.

The drive assist controller causes the brake ECU 16 to control the brake device so that the brake device outputs a stop holding braking force (step ST12A). The stop holding braking force is a braking force having a magnitude capable of stopping the driver's own vehicle at the position at the time and becomes a braking force, when, for example, a so-called creep force is generated in the vehicle, larger than the creep force.

The drive assist controller transmits the information "outside-of-vehicle operation can be carried out" to the driver (step ST12B). The information uses, for example, the sound information, the voice information, the image information, and the character information output by the warning device 41.

The warning controller of the drive assist ECU 11 determines whether or not the parking brake is in operation (step ST12C). When the parking brake is in operation and the braking force is generated, the on-signal of a parking brake switch (parking brake operation detector) 62 is transmitted to the meter ECU 12. On receiving the on-signal, the meter ECU 12 causes the display of the instrument panel to turn on an image showing that the parking brake is in operation. When the on-signal is detected, the warning controller determines that the parking brake is in operation.

Even if the warning controller determines that the parking brake is not in operation, since there is a possibility that the driver operates the parking brake thereafter, the warning controller determines whether or not the parking brake is in operation in the case (step ST12D). The warning controller repeats the determination at step ST12D until a predetermined time has passed from a certain time (for example, after the notification at step ST12B is carried out), and when the parking brake operates during the time in which the determination is repeated, the warning controller goes to step ST12E, whereas when the parking brake does not operate during time, the warning controller determines that there is a high possibility that the parking brake is not operated and goes to step ST12F. The predetermined time is set longer than, for example, the time ordinarily required by the driver until the driver gets off the vehicle after the vehicle has stopped.

Figure 6:
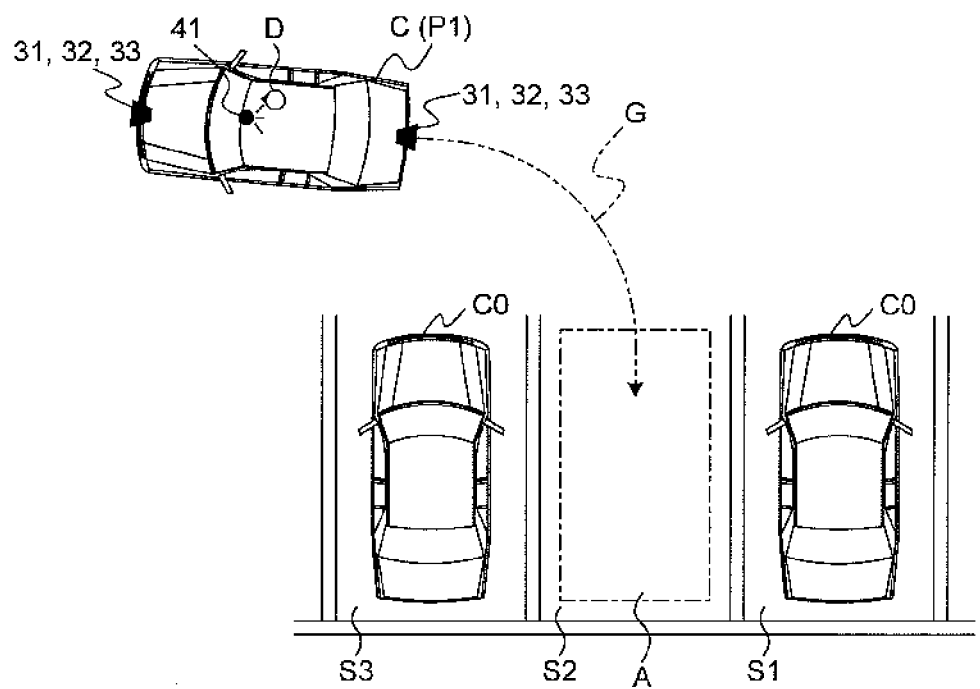
FIG. 6 is a view explaining a warning operation in the vehicle control system of the embodiment.

When the parking brake is in operation or at the timing when the parking brake operates, as illustrated in FIG. 6, the warning controller issues warning to an occupant D in the compartment (step ST12E). As described above, the warning is issued by outputting the information such as the voice information, the character information, and the like that stimulates the sense of hearing and the sense of sight, i.e. the information "release parking brake when the outside of vehicle operation is carried out" from the warning device 41. When the warning is issued in the compartment, the warning controller is prohibited from issuing warning outside of the vehicle. This is because the operator remaining in the compartment at the time makes it useless to issue the warning outside of the vehicle. There is a possibility that the driver releases the parking brake after the reception of the warning although this depends on the judgment of the driver. To overcome the problem, after the warning, the drive assist controller returns to step ST12D and determines again whether or not the parking brake was operated. Note that, after the warning, the drive assist controller may return to step ST12C.

In contrast, when the parking brake does not operate even if the predetermined time has passed, a vehicle getting-off determining unit of the drive assist ECU 11 determines whether or not the operator of the outside-of-vehicle operation device 50 gets off the vehicle (specifically, whether or not the operator has gotten off the vehicle) (step ST12F).

The vehicle control system 1 is provided with a vehicle getting-off detector for detecting that the operator (driver) has gotten off the vehicle from inside of the compartment to outside of the vehicle. The vehicle getting-off detector uses a seat belt switch 63 capable of detecting whether the driver wears or does not wear a seat belt of a seat, a door open/close switch 64 capable of detecting whether a door through which the driver enters and exits is opened or closed, and an occupant detector 65 capable of detecting the state that the driver sits on the seat and the state that the driver does not sit on the seat. The occupant detector 65 can use, for example, a load detector disposed under a seat surface. In the case, when a load being detected cannot be detected, the vehicle getting-off-motion determining unit detects the shift of the driver from the state that the driver sits on the seat to the state that the driver does not sit on the seat. Further, the occupant detector 65 can use an image pick-up device for picking out the seat, a laser device for radiating a laser beam to the seat, a sonar device for radiating an ultrasonic wave to the seat.

When the vehicle getting-off-motion determining unit detects that the seat belt of the seat of the operator shifts from the worn-state to the non-worn state, detects that the door through which the operator enters and exists shifts from the closed-state to the open state and further shifts to the closed-state, and detects that the operator shifts from the state that the operator sits on the seat to the state that operator does not sit on the seat, the vehicle getting-off-motion determining unit determines that the operator (driver) has gotten off the vehicle from inside of the compartment to outside of the vehicle.

Note that, when, for example, an occupant other than the driver has the outside-of-vehicle operation device 50 and acts as the operator, it is difficult to specify the seat of the operator. To cope with the problem, it is necessary to cause the drive assist ECU 11 to recognize the seat of the operator by providing the assist instruction device 21 with, for example, a seat selecting unit.

When the vehicle getting-off-motion determining unit cannot detect that the operator has gotten off the vehicle, there is a possibility that the parking brake is operated, which causes the warning controller to return to step ST12D and to determine again whether or not the parking brake was operated.

In contrast, when the vehicle getting-off-motion determining unit detects that the operator has gotten off the vehicle, the drive assist controller determines whether or not the outside-of-vehicle operation device 50 was operated (the outside-of-vehicle operation was carried out) (step ST12G). When, for example, the drive assist controller receives the control signal of the forward travel operating unit 51 or the rearward travel operating unit 52 of the outside-of-vehicle operation device 50, it determines that the outside-of-vehicle operation was carried out.

When it cannot be detected that the outside-of-vehicle operation was carried out, there is a possibility, for example, that the parking brake is operated by the occupant remaining in the compartment, which causes the warning controller to return to step ST12D and to determine again whether or not the parking brake was operated.

In contrast, when it is detected that the outside-of-vehicle operation was carried out, the drive assist controller carries out the outside-of-vehicle drive assist (the outside-of-vehicle parking assist) depending on the outside-of-vehicle operation (step ST12H).

When it is determined at step ST10 described above that the outside-of-vehicle operation start instruction is not issued or when it is determined at step ST11 that the movement of the driver's own vehicle to the target parking area is not the subject of the outside-of-vehicle operation, the drive assist controller carries out the inside-of-compartment drive assist (the inside-of-compartment parking assist) described above (step ST13).

As described above, when the parking brake is in operation or at the timing when the parking brake operates in the state that the outside-of-vehicle operation mode is selected, the vehicle control system 1 issues warning for prompting the occupant in the compartment to release the parking brake. Specifically, when the operator stays in the compartment, the vehicle control system 1 issues warning in the compartment to release the parking brake and attracts attention of the operator so that the operator does not carry out the outside-of-vehicle operation by getting off the vehicle while operating the parking brake. As a result, the vehicle control system 1 can suppress useless warning to the outside of the vehicle by issuing warning to the operator in the compartment who is a subject to be warned and issuing no warning to the outside of the vehicle at the time. The advantage is particularly outstanding in a vehicle in which the inside of a compartment is isolated from the outside of the vehicle by a vehicle body. Further, in the vehicle control system 1, the travel of the vehicle is not blocked by the braking force of the parking brake because the operator and the like release the parking brake depending on the warning, which can prevent the durability of the parking brake from being reduced by dragging.

Modifications

Incidentally, when the driver puts, for example, the possessions in the compartment in order, the driver may operate the parking brake temporarily. Thus, when warning is issued at once because the parking brake is in operation or is operated, the driver may feel the warning troublesome. In contrast, at the time, there is a possibility that the driver gets off the vehicle, forgetting to release the parking brake. To overcome the problem, Modifications 1 to 4 will explain configurations capable of prompting to release the parking brake while suppressing a troublesome feeling.

Modification 1

Modification 1 will use a vehicle control system 1 which has the same configuration as that of the embodiment and carries out the same control as that of the embodiment except the portion explained below.

In a state that an outside-of-vehicle operation mode is selected and further a shift position sensor 61a detects that a range operating unit (specifically, a shift lever or an operation switch to a P range) is operated to a parking range, a warning controller of a drive assist ECU 11 of the modification issues warning in a compartment to prompt an occupant in the compartment to release a parking brake at the timing when the operation of the parking brake is detected.

Operating the range operating unit to the parking range by a driver is one of the motions of an operator such as the driver so that the operator gets off the vehicle from inside of the compartment to outside of the vehicle, and it can be said that the operator shows an intention for getting off the vehicle. For this reason, in the state that the outside-of-vehicle operation mode is selected, the vehicle control system 1 waits that the operator expresses the intention for getting off the vehicle by operating the range operating unit to the parking range and, after the operation to the parking range has been completed, the vehicle control system 1 issues warning in the compartment at the timing when the driver operates the parking brake.

Figure 7:
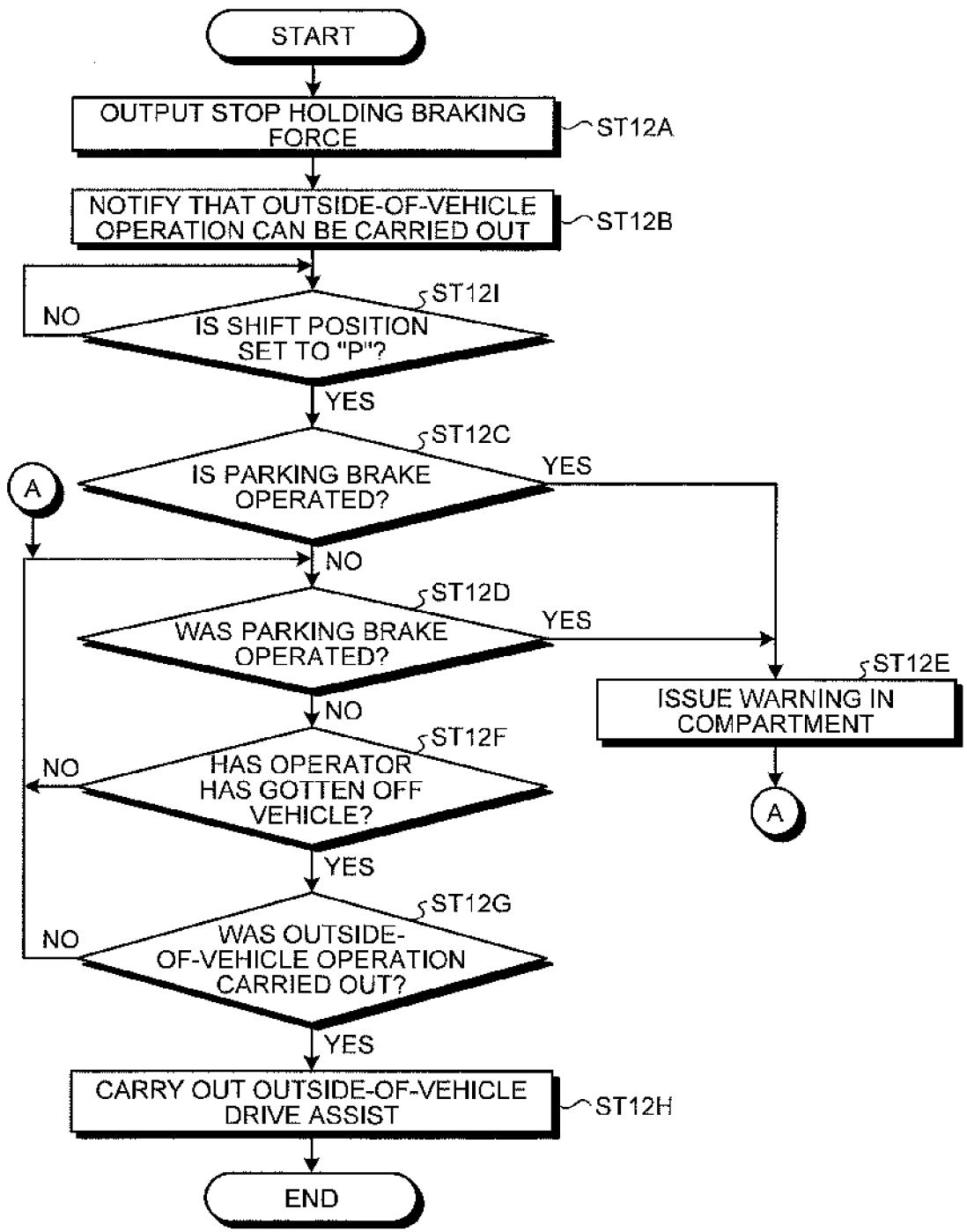
FIG. 7 is a flowchart explaining an arithmetic processing operation of an outside-of-vehicle drive assist in a vehicle control system of Modification 1.

An arithmetic processing operation of the vehicle control system 1 of the modification will be explained based on the flowchart of FIG. 7. Note that, in FIG. 7, the same arithmetic processings will be carried out at the steps denoted by the same alphanumeric characters with "prefix ST" as those of FIG. 5, which allows to omit the explanations overlapping those of FIG. 5.

For example, after the warning controller has notified at step ST12B that the outside-of-vehicle operation can be carried out, it determines whether or not a shift position is in the parking range (whether or not it is at "P") (step ST12I). When the shift position is in the parking range, the warning controller goes to step ST12C and confirms whether or not the parking brake is in operation. When the warning controller determines at step ST12C that the parking brake is not yet in operation, it goes to step ST12E at the timing when the operation of the parking brake is detected at step ST12D and issues warning in the compartment but issues no warning outside of the vehicle. Further, also when the warning controller determines at step ST12C that the parking brake is in operation, it goes to step ST12E and issues warning in the compartment. Note that, in the exemplification, the shift position that is not in the parking range causes the determination at step ST12I to be repeated.

Since the vehicle control system 1 of the modification takes the intention of the driver for getting off the vehicle expressed by operating the range operating unit to the parking range into consideration, the modification can reduce the possibility that warning becomes troublesome to the driver while obtaining the same advantage as the embodiment when the parking brake is in operation or at the timing when the parking brake operates.

As described above, the motion of the operator for getting off the vehicle expresses the intention of the operator for getting off the vehicle and, for example, the operations of the operator to remove a seat belt, to open a side door, and to shift from the state that the operator sits on a seat to the state that the operator does not sit on the seat in addition to the operation of the range operating unit to the parking range correspond to the motion of the operator for getting off the vehicle. Summarizing what has been described above allows to replace step ST12I with the determination whether or not the operator carries out the operation for getting off the vehicle. Specifically, in the vehicle control system 1, when the parking brake is in operation or at the timing when the operation of the parking brake is detected in the state that the outside-of-vehicle operation mode is selected and the operator carries out the motion for getting off the vehicle, it is also possible to issue the warning in the compartment to prompt the occupant in the compartment to release the parking brake.

In the case, the vehicle control system 1 of the modification is provided with a vehicle getting-off-motion detector for detecting the motion of the operator for getting off the vehicle from inside of the compartment to outside of the vehicle. The drive assist ECU 11 is provided with a vehicle getting-off-motion determining unit that determines whether or not the operator carries out the motion for getting off the vehicle from inside of the compartment to outside of the vehicle based on the result of detection of the vehicle getting-off-motion detector.

The vehicle getting-off-motion detector uses at least one of the shift position sensor 61a, the seat belt switch 63, the door open/close switch 64, and the occupant detector 65 described above. Thus, the vehicle getting-off-motion determining unit of the drive assist ECU 11 is caused to determine that the operator carries out the motion for getting off the vehicle from inside of the compartment to outside of the vehicle when the motion corresponds to at least one of the states that the shift position sensor 61a detects the operation of the range operating unit to the parking range, detects the change of the seat belt of the seat of the operator from the worn-state to the non-worn state, detects the change of the door through which the operator enters and exits from the closed-state to the open-state, and detects the shift state of the operator from the state that the operator sits on the seat to the state that the operator does not sit on the seat.

Even if the arithmetic processing is carried out as described above, the vehicle control system 1 of the modification takes the intention of the driver for getting off the vehicle into consideration, which can reduce the possibility that the warning becomes troublesome to the driver while obtaining the same advantage as that of the embodiment in the state that the parking brake is in operation or at the timing when the parking brake operates.

Modification 2

Modification 2 will use a vehicle control system 1 which has the same configuration as that of the embodiment and carries out the same control as that of the embodiment except the portion explained below.

When an outside-of-vehicle operation mode is selected, the modification issues warning in a compartment at a predetermined timing after a parking brake has operated by determining that an operator will cause a vehicle to travel at some time regardless that the time having passed after the selection of the outside-of-vehicle operation mode is long or short.

When the outside-of-vehicle operation mode is selected, the operation of the parking brake is detected, and it is not detected that the operator has gotten off the vehicle from inside of the compartment to outside of the vehicle, a warning controller of a drive assist ECU 11 of the modification issues warning in the compartment to prompt an occupant in the compartment to release a parking brake. Specifically, when the outside-of-vehicle operation mode is selected, the operation of the parking brake is detected, and it is not detected that the operator has gotten off the vehicle from inside of the compartment to outside of the vehicle regardless that a predetermined time has passed after the detection of operation of the parking brake, the warning controller issues the warning.

Figure 8:
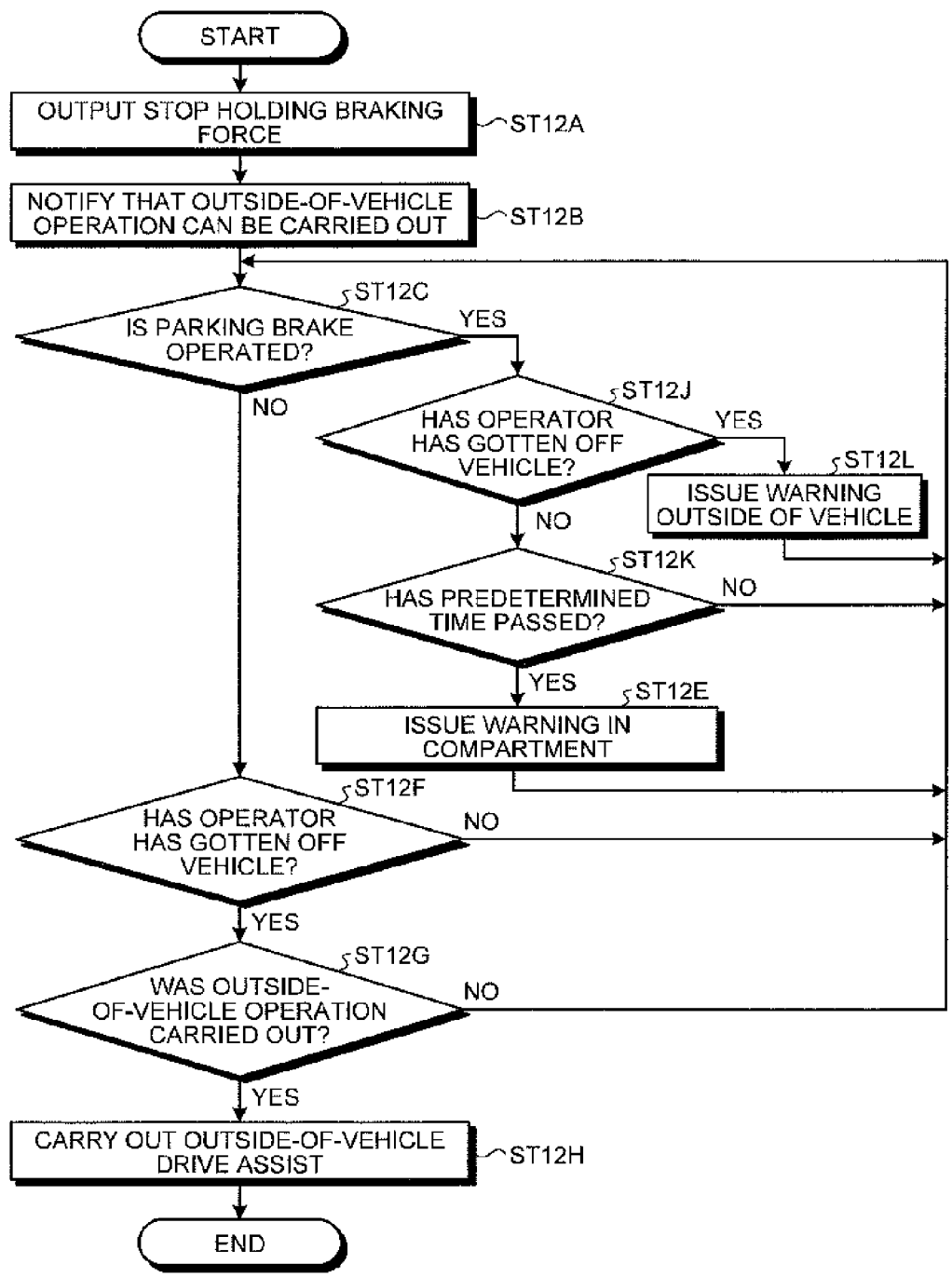
FIG. 8 is a flowchart explaining an arithmetic processing operation of an outside-of-vehicle drive assist in a vehicle control system of Modification 2.

An arithmetic processing operation of the vehicle control system 1 of the modification will be explained based on the flowchart of FIG. 8. Note that, in FIG. 8, the same arithmetic processing will be carried out at the steps denoted by the same alphanumeric characters with "prefix ST" as those of FIG. 5, which allows to omit the explanations overlapping those of FIG. 5.

When it is determined at step ST12C that the parking brake is in operation, a vehicle getting-off determining unit of the drive assist ECU 11 determines whether or not the operator of the outside-of-vehicle operation device 50 has gotten off the vehicle (step ST12J). It is sufficient to carry out the determination in the same manner as step ST12F described above.

When the operator has not gotten off the vehicle, the warning controller determines whether or not a predetermined time has passed after, for example, the detection of operation of the parking brake (step ST12K). The predetermined time is set longer than, for example the time required by the driver until the driver has ordinarily gotten off the vehicle after the operation of the parking brake.

There is also a possibility that the parking brake is released, which causes the warning controller to return, when the predetermined time has not passed, to step ST12C and to confirm again whether or not the parking brake is in operation.

In contrast, when the warning controller determines that the predetermined time has passed, it goes to step ST12E, issues warning in the compartment but issues no warning outside the vehicle. The warning controller returns to step ST12C and confirms again whether or not the parking brake is in operation.

When the warning controller determines at step ST12C that the parking brake is not in operation, the vehicle getting-off motion determining unit goes to step ST12F and determines whether or not the operator has gotten off the vehicle. When it is detected that the operator has gotten off the vehicle, the drive assist controller of the drive assist ECU 11 goes to step ST12G and determines whether or not the outside-of-vehicle operation is carried out. When it is not detected at step ST12F that the operator has gotten off the vehicle or when the outside-of-vehicle operation is not detected at step ST12G, since there is a possibility that the parking brake is operated, the warning controller returns to step ST12C and confirms again whether or not the parking brake is in operation.

As described above, even if the parking brake is in operation, the vehicle control system 1 of the modification withholds to output warning until the predetermined time has passed while the operator does not get off the vehicle. In contrast, when the predetermined time has passed while the operator does not get off the vehicle in the state that the parking brake is in operation, the vehicle control system 1 issues warning in the compartment, which allows the same advantage as the embodiment to be obtained while suppressing the driver from feeling warning troublesome.

Figure 9:
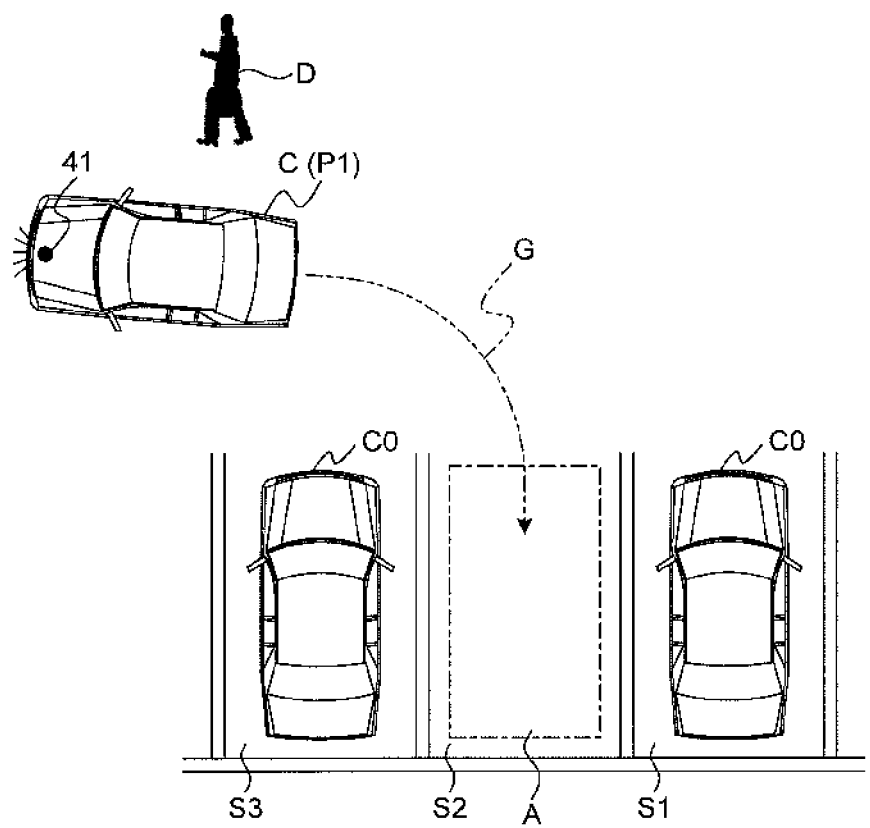
FIG. 9 is a view explaining a warning operation in the vehicle control system of Modification 2.

There is also a possibility that the operator has gotten off the vehicle before the passage of the predetermined time. To overcome the problem, when it is detected at step ST12J that the operator has gotten off the vehicle, the warning controller issues warning for prompting to release the parking brake outside of the vehicle (step ST12L). The warning is issued to an operator D outside of the vehicle by, for example, turning on or blinking a head light 66 of the vehicle or sounding a horn (so-called Klaxon) 67 of the vehicle (FIG. 9) via a body ECU 17. Specifically, when warning is issued outside of the vehicle, the head light 66 and the horn 67 are used as a warning device. Further, an-outside-of-vehicle notification warning device (illustration omitted) may be additionally provided and the warning may be issued by outputting voice information such as "release the parking brake in the outside-of-vehicle operation" and the like from the warning device. When the warning is issued outside of the vehicle, the outside-of-vehicle operation device 50 may be provided with the function of the warning device, warning information for stimulating the sense of hearing may be output from the outside-of-vehicle operation device 50, or warning information for stimulating the sense of sight may be displayed on a display of the outside-of-vehicle operation device 50. The warning information may be equivalent to the warning output in the compartment.

After the operator has received the warning outside of the vehicle, there is a possibility that the operator gets on the vehicle to release the parking brake. To overcome the problem, after the warning is issued, the warning controller returns to step ST12C and confirms again whether or not the parking brake is in operation.

In this way, when the outside-of-vehicle operation mode is selected, the operation of the parking brake is detected, and it is detected that the operator has gotten off the vehicle before the predetermined time passes (specifically, a time at which warning is issued in the compartment is reached), the vehicle control system 1 of the modification issues warning outside of the vehicle to prompt to release the parking brake. Specifically, when the operator stays outside of the vehicle, the vehicle control system 1 issues warning outside of the vehicle to release the parking brake and attracts attention of the operator so that the operator does not carry out the outside-of-vehicle operation while operating the parking brake. Thus, the vehicle control system 1 issues the warning to the operator who is a subject to be warned and stays outside of the vehicle so that useless warning to the inside of the compartment can be suppressed. The advantage is outstanding in a vehicle the inside of a compartment of which is isolated from the outside thereof by a vehicle body.

Even if the operator exits the vehicle to the outside of the vehicle, other occupant may remain in the compartment. The warning controller may issue the warning described above in the compartment together with the warning outside of the vehicle. With the operation, since the vehicle control system 1 can issue warning for prompting plural persons inside and outside of the vehicle to release the parking brake, the outside-of-vehicle operation can be more effectively suppressed while keeping the parking brake in operation.

Figure 10:
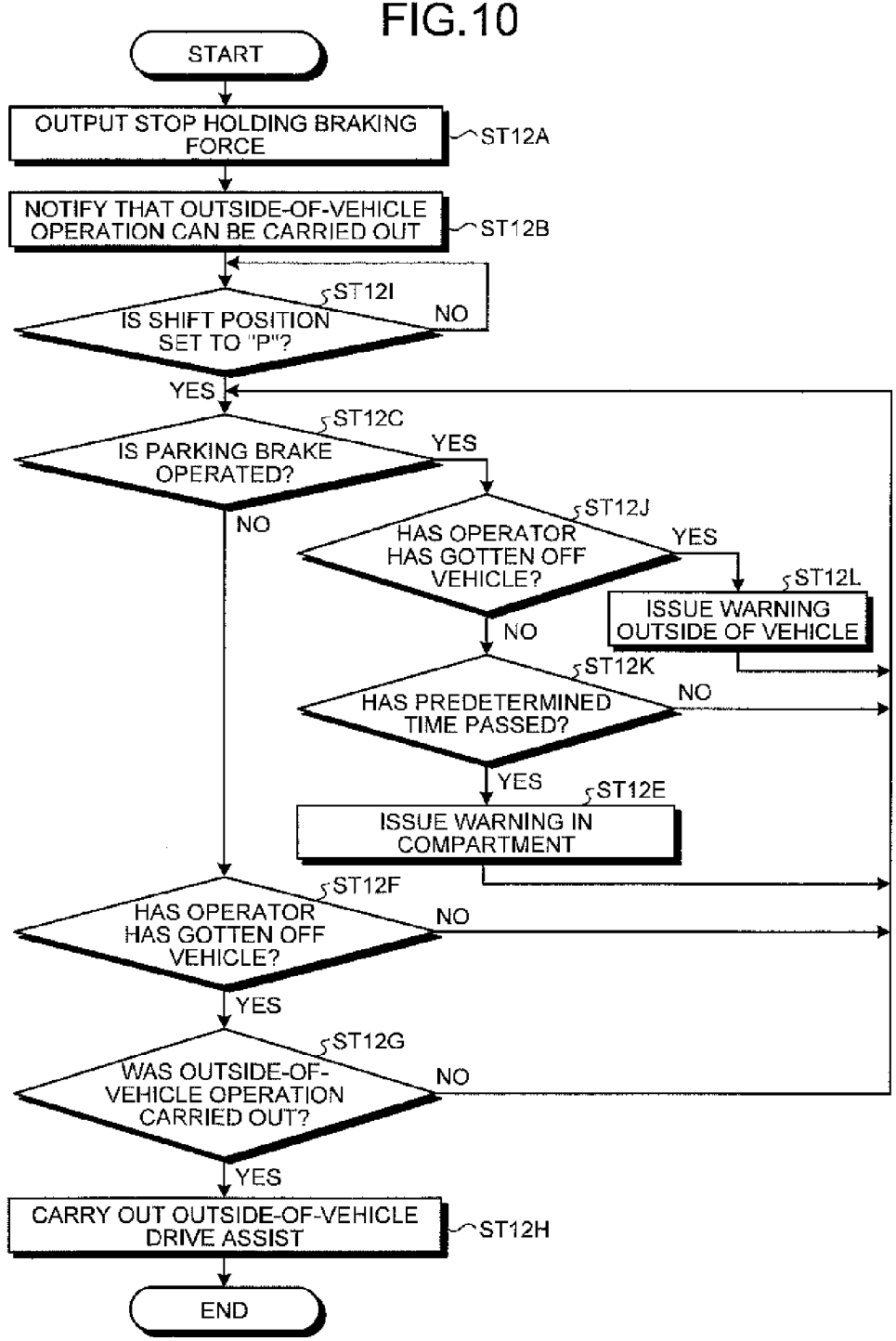
FIG. 10 is a flowchart explaining other arithmetic processing operation of the outside-of-vehicle drive assist in the vehicle control system of Modification 2.

Further, in the vehicle control system 1 of the modification, operating a range operating unit to a parking range may be added to the condition for carrying out the warning inside and outside of the compartment like Modification 1. In the case, after the warning controller notifies at step ST12B that the outside-of-vehicle operation can be carried out like Modification 1, it goes to step ST12I and determines whether or not a shift position is in the parking range (FIG. 10). Thereafter, when the shift position is in the parking range, the warning controller goes to step ST12C and confirms whether or not the parking brake is in operation. With the operation, the vehicle control system 1 can obtain the same advantage as that of Modification 1. In contrast, when the shift position is not in the parking range, the warning controller repeats the determination at step ST12I. Note that, in FIG. 10, the same arithmetic processings will be carried out at the steps denoted by the same alphanumeric characters with "prefix ST" as those of FIG. 8. As explained in Modification 1, step ST12I can be replaced with the determination whether or not the operator carries out the operation for getting off the vehicle.

Modification 3

Modification 3 will use a vehicle control system 1 which has the same configuration as that of Modification 2 and carries out the same control as that of Modification 2 except the portion explained below.

When an outside-of-vehicle operation mode is selected, the operation of a parking brake is detected, and it is detected that an operator has gotten off a vehicle, Modification 2 issues warning outside of the vehicle to prompt to release the parking brake. However, there is a case that a driver temporarily operates the parking brake for safety when, for example, a baggage and the like is taken into or out from a baggage chamber. In the case, there is a possibility that the warning becomes troublesome to the operator outside of the vehicle. To cope with the problem, when the outside-of-vehicle operation mode is selected, the operation of the parking brake is detected, and it is detected the operator has gotten off the vehicle, the vehicle control system 1 of Modification 3 issues warning outside of the vehicle when it receives the control signal from an outside-of-vehicle operation device 50.

Figure 11:
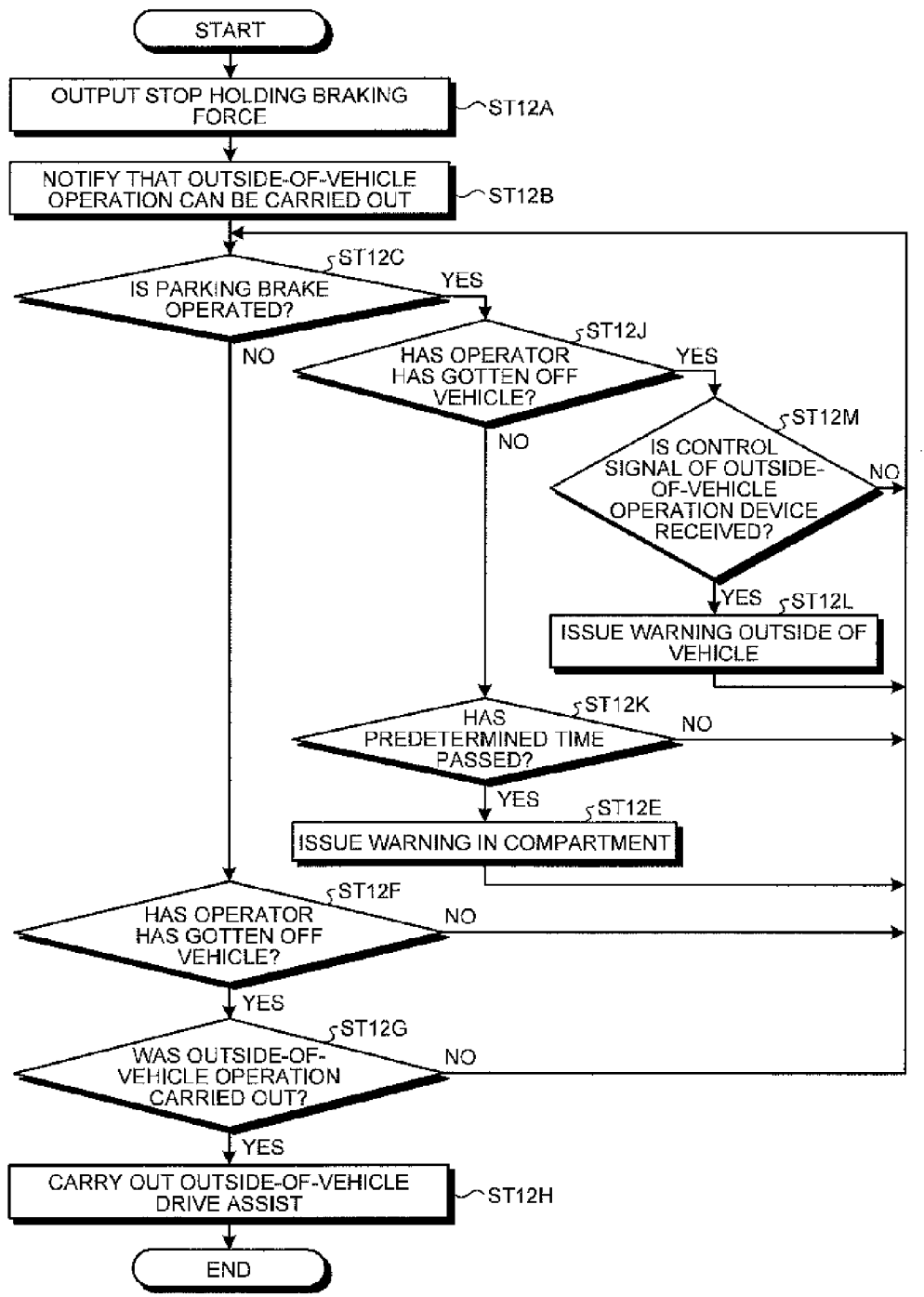
FIG. 11 is a flowchart explaining an arithmetic processing operation of an outside-of-vehicle drive assist in a vehicle control system of Modification 3.

An arithmetic processing operation of the vehicle control system 1 of the modification will be explained based on the flowchart of FIG. 11. Although the arithmetic processing operation will be explained as an example based on the flowchart of FIG. 8 of Modification 2, it may be explained based on the flowchart of FIG. 10 of Modification 2. Even if the arithmetic processing operation is based on any of the flowcharts, the arithmetic processing explained below is the same processing. Note that, in FIG. 11, the same arithmetic processing will be carried out at the steps denoted by the same alphanumeric characters with "prefix ST" as those of FIG. 8, which allows to omit the explanations overlapping those of FIG. 8.

When the parking brake is in operation and when the operator has gotten off the vehicle, a warning controller determines whether or not the outside-of-vehicle operation device 50 is operated (an outside-of-vehicle operation) and specifically determines whether or not the control signal from the outside-of-vehicle operation device 50 is received (step ST12M). When the control signal is not received, there is a possibility that the parking brake is released, which causes the warning controller to return to step ST12C again and to determine whether or not the parking brake is in operation again. In contrast, when the control signal is received, the warning controller goes to step ST12L and issues warning outside of the vehicle.

As described above, the vehicle control system 1 of the modification issues no warning outside of the vehicle until it is requested to carry out the outside-of-vehicle operation from the outside-of-vehicle operation device 50, and when the vehicle control system 1 is requested to carry out the outside-of-vehicle operation from the outside-of-vehicle operation device 50, it issues warning outside of the vehicle, which allows to obtain the same advantage as that of Modification 2 while suppressing the driver from feeling warning outside of the vehicle troublesome more than Modification 2.

Modification 4

Modification 4 will use a vehicle control system 1 which has the same configuration as that of the embodiment and carries out the same control as that of the embodiment except the portion explained below.

Like Modification 2, when an outside-of-vehicle operation mode is selected, the modification issues warning in a compartment at a predetermined timing after a parking brake has operated by determining that an operator will cause a vehicle to travel at some time regardless that the time having passed after the selection of the outside-of-vehicle operation mode is long or short.

When the outside-of-vehicle operation mode is selected, when the operation of the parking brake is detected, and when the motion of the operator for getting off the vehicle from inside of the compartment to outside of the vehicle is not detected, a warning controller of a drive assist ECU 11 of the modification issues warning in the compartment to prompt an occupant in the compartment to release a parking brake. Specifically, when the outside-of-vehicle operation mode is selected, when the operation of the parking brake is detected, and when it is not detected that the operator has gotten off the vehicle from inside of the compartment to outside of the vehicle regardless that a predetermined time has passed after the detection of operation of the parking brake, the warning controller issues the warning.

The vehicle control system 1 of the modification is provided with the vehicle getting-off-motion detector and the vehicle getting-off-motion determining unit of the drive assist ECU 11 described above.

Figure 12:
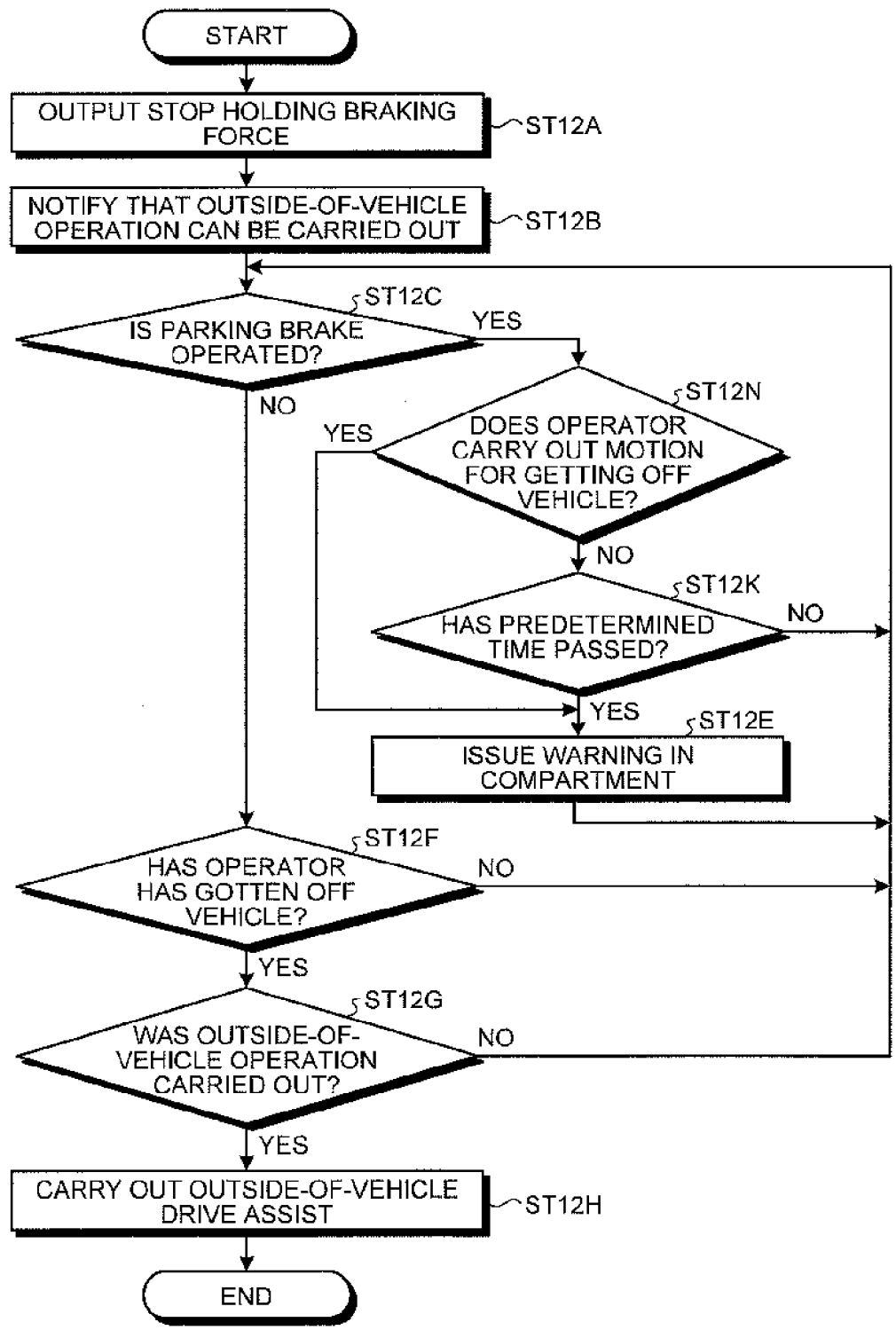
FIG. 12 is a flowchart explaining an arithmetic processing operation of an outside-of-vehicle drive assist in a vehicle control system of Modification 4.

An arithmetic processing operation of the vehicle control system 1 of the modification will be explained based on the flowchart of FIG. 12. Note that, in FIG. 12, the same arithmetic processing will be carried out at the steps denoted by the same alphanumeric characters with "prefix ST" as those of FIG. 5, which allows to omit the explanations overlapping those of FIG. 5.

When it is determined at step ST12C that the parking brake is in operation, the vehicle getting-off-motion determining unit determines whether or not the operator carries out the motion for getting off the vehicle like Modification 1 described above (step ST12N).

When the operator carries out no motion for getting off the vehicle, the warning controller determines whether or not a predetermined time has passed after, for example, the operation of the parking brake is detected (step ST12K). The predetermined time is set to the same time as, for example, the predetermined time of Modification 2.

There is also a possibility that the parking brake is released, which causes the warning controller to return, when the predetermined time has not passed, to step ST12C and to confirm again whether or not the parking brake is in operation.

In contrast, when the warning controller determines that the predetermined time has passed, it goes to step ST12E, issues warning in the compartment, and returns to step ST12C. Also when the warning controller determines at step ST12N that the operator carries out the motion for getting off the vehicle, it goes to step ST12E and issues warning in the compartment. When the warning controller issues warning in the compartment, it issues no warning outside of the vehicle.

Further, when it is determined at step ST12C that the parking brake is not in operation, the vehicle getting-off motion determining unit goes to step ST12F likewise in the case of Modification 2.

In this way, even if the parking brake is in operation, when the operator does not carry out even the motion for getting off the vehicle, since the vehicle control system 1 of the modification withholds to output warning until a predetermined time has passed, the same advantage as the embodiment can be obtained while suppressing the driver from feeling warning trouble.

Figure 13:
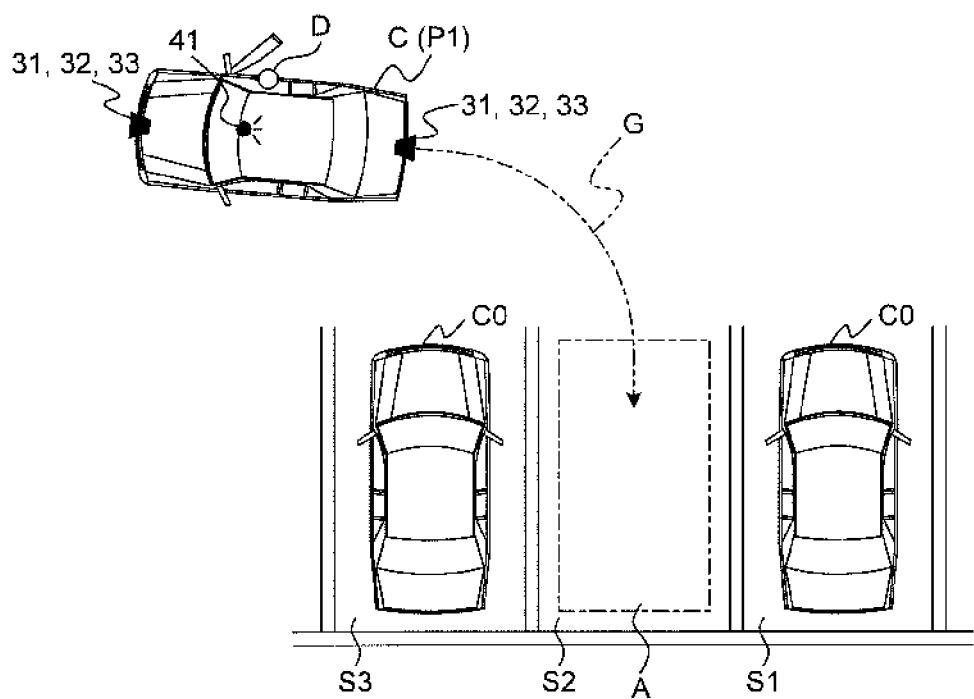
FIG. 13 is a view explaining a warning operation in the vehicle control system of Modification 4.

Among the motions of the operator for getting off the vehicle exemplified above, it can be said in particular the operation for the operator to remove the seat belt, the operation for the operator to open the door on the seat side, and the shift motion of the operator from the state that the operator sits on the seat to the state that the operator does not sit on the seat are the motions carried out while the operator is getting off the vehicle from inside of the compartment to outside of the vehicle. For this reason, the vehicle control system 1 of the modification can replace the determination at step ST12N with the determination "whether or not the operator is getting off the vehicle". Specifically, when the outside-of-vehicle operation mode is selected, the operation of the parking brake is detected, and an operator D is getting off the vehicle, the vehicle control system 1 issues warning for prompting the occupant in the compartment to release the parking brake at step ST12E (FIG. 13). Further, when the outside-of-vehicle operation mode is selected, the operation of the parking brake is detected, and the operator does not begin to get off the vehicle even if a predetermined time has passed after the detection of operation of the parking brake, the vehicle control system 1 issues warning in the compartment.

Modification 5

Modification 5 has at least two configurations of the configurations relating to the warning issued in and outside of the compartments of the embodiment and Modifications 1 to 4 described above.

For example, in Modification 5, the warning issued in the compartment of the embodiment when the parking brake is in operation in the state that the outside-of-vehicle operation mode is selected is called a first warning mode (an inside-of-compartment warning mode while the parking brake is in operation), and the warning issued in the compartment of the embodiment at the timing when the parking brake operates in the state that the outside-of-vehicle operation mode is selected is called a second warning mode (an inside-of-compartment warning mode at the timing when the parking brake operates).

The warning issued in the compartment of Modification when the parking brake is in operation in the state that the outside-of-vehicle operation mode is selected and an operator carries out the motion for getting off the vehicle is called a third warning mode (an inside-of-compartment warning mode while the parking brake is in operation after the vehicle getting-off motion has been carried out), and the warning issued in the compartment of Modification 1 at the timing when the parking brake operates in the state that the outside-of-vehicle operation mode is selected and additionally the operator carries out the motion for getting off the vehicle is called a fourth warning mode (an inside-ofcompartment warning mode at the timing when the parking brake operates after the vehicle getting-off motion has been carried).

The warning issued in the compartment of Modification 2 when the outside-of-vehicle operation mode is selected, the operation of the parking brake is detected, and it is not detected that the operator has gotten off the vehicle from inside of the compartment to outside of the vehicle is called a fifth warning mode (an inside-of-compartment warning mode when the vehicle getting-off motion is not detected while the parking brake is in operation), and the warning issued outside of the vehicle in Modification 2 when the outside-of-vehicle operation mode is selected, the operation of the parking brake is detected, and it is detected that the operator has gotten off the vehicle from inside of the compartment to outside of the vehicle is called a sixth warning mode (an outside-of-vehicle warning mode while the parking brake is in operation). The warning issued in the compartment of Modification 2 when the outside-of-vehicle operation mode is selected, the operation of the operator for getting off the vehicle is detected, the operation of the parking brake is detected, and it is not detected that the operator has gotten off the vehicle from inside of the compartment to outside of the vehicle is called a seventh warning mode (an inside-of-compartment warning mode while the parking brake is in operation when the vehicle getting-off motion is not detected after the vehicle getting-off motion has been carried out).

The warning issued outside of the vehicle of Modification 3 when the control signal from an outside-of-vehicle operation device 50 is received in the state that the outside-of-vehicle operation mode is selected, the operation of the parking brake is detected, and the completion of motion of the operator for getting off the vehicle from inside of the compartment to outside of the vehicle is detected is called an eighth warning mode (an outside-of-vehicle warning mode when the vehicle is operated from outside of the vehicle while the parking brake is in operation).

Further, the warning issued in the compartment of Modification 4 when the outside-of-vehicle operation mode is selected, the operation of the parking brake is detected, and the motion of the operator for getting off the vehicle from inside of the compartment to outside of the vehicle is not detected is called a ninth warning mode (an inside-of-compartment warning mode when the vehicle getting-off motion is not carried out while the parking brake is in operation). Note that the warning of the third warning mode is the same as the warning issued in the compartment in Modification 4 when the outside-of-vehicle operation mode is selected, the operation of the parking brake is detected, and the motion of the operator for getting off the vehicle from inside of the compartment to outside of the vehicle is detected.

Figure 14:
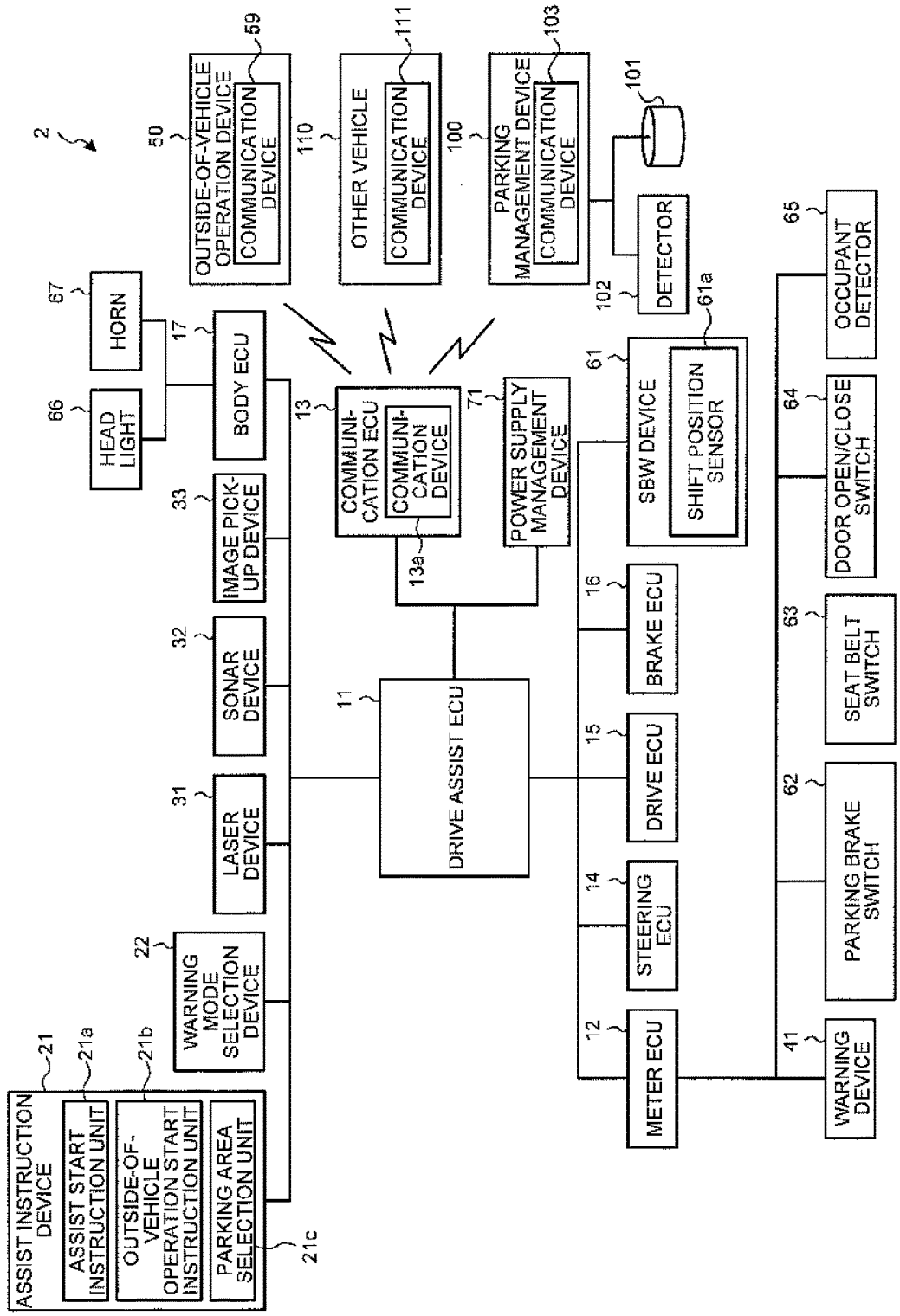
FIG. 14 is a block diagram illustrating a configuration of a vehicle control system of Modification 5.

FIG. 14 illustrates a configuration of a vehicle control system 2 of the modification. The vehicle control system 2 has at least two warning modes of the warning modes described above. The vehicle control system 2 is provided with a warning mode selection device 22 for enabling the operator to select the warning modes in the configuration of at least one vehicle control system 1 of the embodiment and Modifications 1 to 4 having the warning modes. When at least the two warning modes are embodied in at least two vehicle control systems 1 of the embodiment and Modifications 1 to 4, the vehicle control system 2 is provided with the warning mode selection device 22 in a vehicle control system including all the configurations of the respective vehicle control systems 1.

The warning mode selection device 22 is, for example, a warning mode selection button disposed to an instrument panel in the compartment, a warning mode selection switch displayed on a touch panel of a monitor in the compartment. Further, the warning mode selection device 22 may be a warning mode selecting unit disposed to an assist start instructing unit 21a and the outside-of-vehicle operation device 50.

With the configuration, since the vehicle control system 2 of Modification 5 allows the operator to set a warning mode in conformity with a preference, the operator can be suppressed from feeling warning troublesome.

Modification 6

Figure 15:
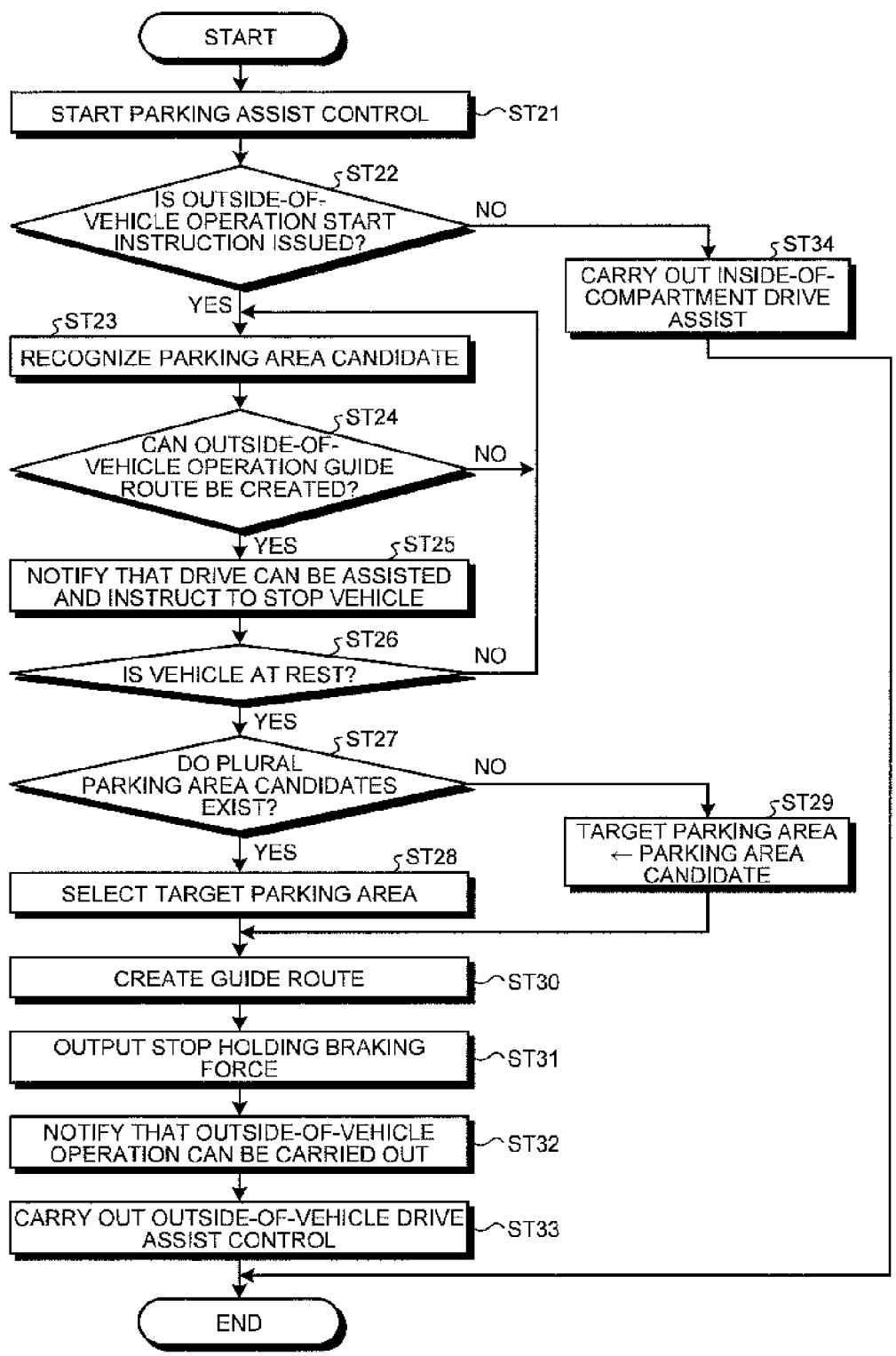
FIG. 15 is a flowchart explaining an arithmetic processing operation in a vehicle control system in Modification 6.
Figure 16:
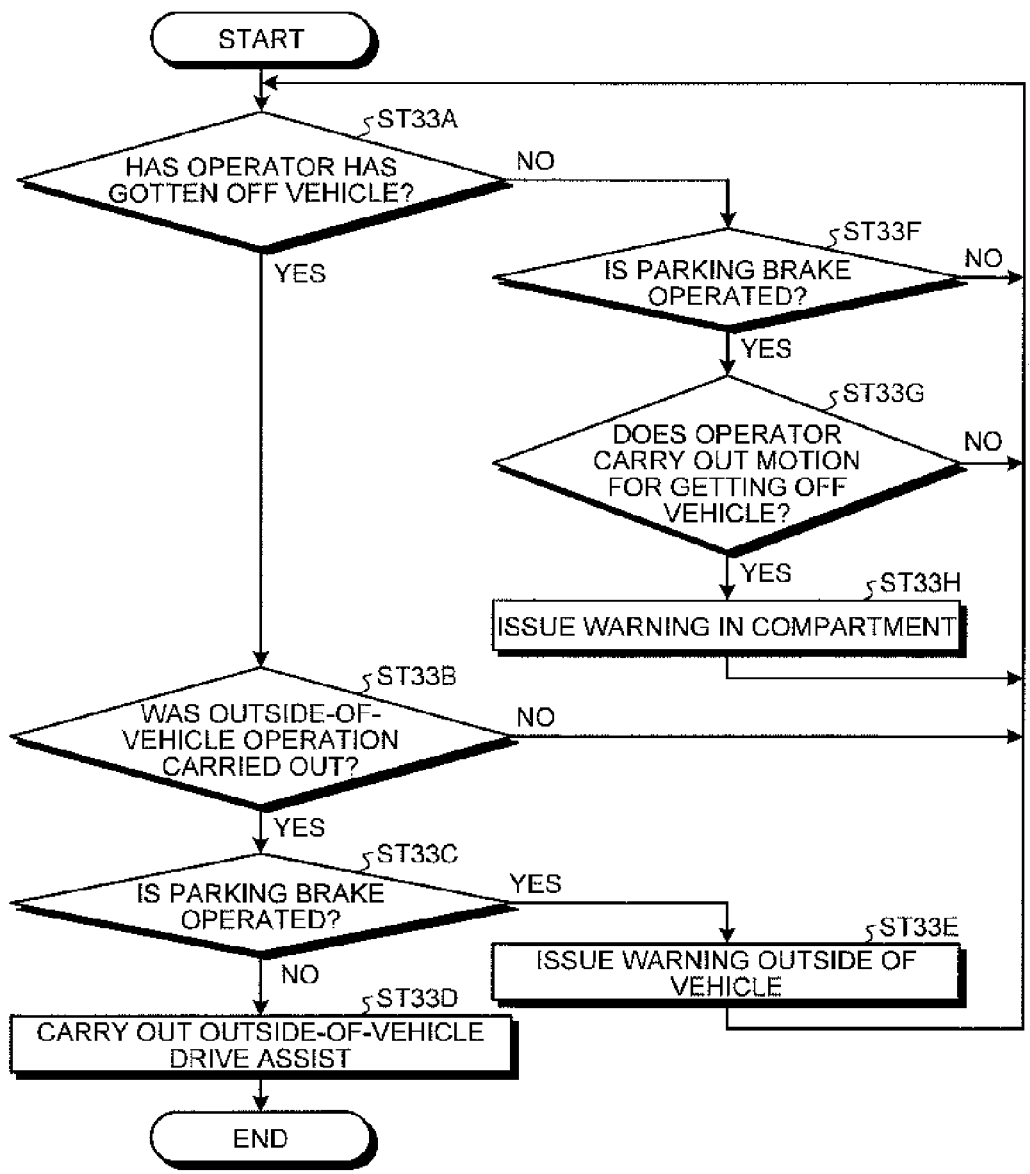
FIG. 16 is a flowchart explaining an arithmetic processing operation of an outside-of-vehicle drive assist in a vehicle control system of Modification 6.

Incidentally, the vehicle control system 1 described above may issue warning in and outside of the compartment as described below. An arithmetic processing operation of a vehicle control system 1 of Modification 6 will be explained based on the flowcharts of FIG. 15 and FIG. 16.

On receiving the start signal output in association with the operation of an assist start instructing unit 21a, a drive assist ECU 11 starts drive assist control (parking assist control) (step ST21). Specifically, periphery monitor control begins.

A drive assist controller of the drive assist ECU 11 determines whether or not an outside-of-vehicle operation start instruction is issued in the same manner as step ST10 (step ST22). When the outside-of-vehicle operation start instruction is not issued, the drive assist controller goes to step ST34 and carries out the inside-of-compartment drive assist (the inside-of-compartment parking assist) described above.

In contrast, when the outside-of-vehicle operation start instruction is issued, a parking area calculating unit of the drive assist ECU 11 recognizes a parking area candidate of a driver's own vehicle in the same manner as step ST2 (step ST23).

A route creating unit of the drive assist ECU 11 determines whether or not an outside-of-vehicle operation guide route from the position of the driver's own vehicle at the time to the parking area candidate can be created (step ST24). The determination is carried out by the determination at step ST3 in combination with the determination at step ST11. Specifically, at step ST24, the route creating unit determines a guide route which can be created in the same manner as step ST3. Then, the route creating unit determines whether or not the movement of the driver's own vehicle to the parking area candidate corresponding to the guide route which can be created is the subject of the outside-of-vehicle operation under the same determination method as that at step ST11. At step ST24, the guide route to the parking area candidate which is the subject of the outside-of-vehicle operation is recognized as the outside-of-vehicle operation guide route. Thus, at step ST24, when the recognition is achieved, it is determined that the outside-of-vehicle operation guide route can be created.

When it is determined that the outside-of-vehicle operation guide route cannot be created, the parking area calculating unit returns to step ST23 and recognizes a parking area candidate of the driver's own vehicle again. At the time, the parking area calculating unit preferably transmits, for example, the information for prompting to move the vehicle described above to a driver by the voice information and the character information of a warning device 41.

When it is determined at step ST24 that the outside-of-vehicle operation guide route can be created, the drive assist controller transmits the information "it is possible to assist a drive (parking)" and "a stop instruction" to the driver in the same manner as step ST4 (step ST25).

The parking area calculating unit determines whether or not the driver's own vehicle is at rest in the same manner as step ST5 (step ST26). When the driver's own vehicle moves, since there is a possibility that the guide route the creation of which is determined possible cannot be used, the parking area calculating unit returns to step ST23 and recognizes a parking area candidate of the driver's own vehicle again.

When the driver's own vehicle is at rest, the parking area calculating unit determines whether or not plural parking area candidates which can create the outside-of-vehicle operation guide route exist (step ST27).

When such plural parking area candidates exist, the parking area calculating unit selects a target parking area from them (step ST28). Also at step ST28, the drive assist ECU 11 may be caused to select the target parking area in the same manner as step ST7 and to display the selection switches (a parking area selecting unit 21c) depending on the plural parking area candidates, and the driver may be caused to select a target parking area candidate from them.

In contrast, when only one parking area candidate exists which can create the outside-of-vehicle operation guide, the parking area calculating unit selects the parking area candidate as a target parking area (step ST29).

The route creating unit creates the guide route from the position of the driver's own vehicle at the time to the selected target parking area (step ST30).

Thereafter, the drive assist controller outputs a stop holding braking force in the same manner as steps ST12A and ST12B (step ST31) and transmits information "outside-of-vehicle operation can be carried out" to the driver (step ST32).

Subsequently, the drive assist controller carries out outside-of-vehicle drive assist control (outside-of-vehicle parking assist control) after the information is notified (step ST33). The outside-of-vehicle drive assist control (the outside-of-vehicle parking assist control) will be explained based on the flowchart of FIG. 16.

A vehicle getting-off determining unit determines whether or not an operator of an outside-of-vehicle operation device 50 has gotten off the vehicle in the same manner as step ST12F (step ST33A).

When it is detected that the operator has gotten off the vehicle, the drive assist controller determines whether or not the outside-of-vehicle operation is carried out in the same manner as step ST12G (step ST33B).

When the outside-of-vehicle operation is not carried out, there is a possibility that the operator stays in the vehicle. In the case, the drive assist controller returns to step ST33A and causes the vehicle getting-off motion determining unit to determine again whether or not the operator has gotten off the vehicle.

In contrast, when it is detected that outside-of-vehicle operation is carried out, the warning controller determines whether or not a parking brake is in operation in the same manner as step ST12C (step ST33C).

When the parking brake is not in operation, the drive assist controller carries out the outside-of-vehicle drive assist (the outside of the vehicle parking assist) depending on outside-of-vehicle operation at step ST33B (step ST33D).

In contrast, when the parking brake is in operation, the warning controller issues, outside of the vehicle, warning for prompting to release the parking brake in the same manner as step ST12L (step ST33E). There is a possibility that the operator gets on the vehicle to release the parking brake after the reception of the warning. Thus, the drive assist controller returns to step ST33A after the warning has been issued and causes the vehicle getting-off motion determining unit to determine again whether or not the operator has gotten off the vehicle.

Further, when it is determined at step ST33A that the operator has not gotten off the vehicle, the warning controller determines whether or not the parking brake is in operation in the same manner as step ST12C (step ST33F).

When the parking brake is not in operation, there is a possibility that the operator has gotten off the vehicle. In the case, the drive assist controller returns to step ST33A and causes the vehicle getting-off motion determining unit to determine again whether or not the operator has gotten off the vehicle.

In contrast, when the parking brake is in operation, the vehicle getting-off-motion determining unit determines whether or not the operator carries out the motion for getting off the vehicle in the same manner as step ST12N (step ST33G).

Even if the operator does not carry out the motion for getting off the vehicle at the timing, there is also a possibility that operator gets off the vehicle thereafter. Thus, when it is determined that the operator does not carry out the motion for getting off the vehicle, the drive assist controller returns to step ST33A and causes the vehicle getting-off motion determining unit to determine again whether or not the operator has gotten off the vehicle.

In contrast, when it is determined that the operator carries out the motion for getting off the vehicle, the warning controller issues warning in the compartment to prompt to release the parking brake in the same manner as step ST12E (step ST33H). There is a possibility that the driver releases the parking brake and gets off the vehicle after the reception of the warning. Thus, after the warning has been issued, the drive assist controller returns to step ST33A and causes the vehicle getting-off motion determining unit to determine again whether or not the operator has gotten off the vehicle.

Even if the vehicle control system 1 of the modification carries out the warning by the arithmetic processing having the flow described above, it can obtain the same advantage as that exemplified above.

In the vehicle control systems 1 and 2 of the embodiment and Modifications 1 to 6, the outside-of-vehicle operation device 50 may be provided with an ignition-on operating unit 55 and an ignition-off operating unit 56 (FIG. 2). The ignition-on operating unit 55 is an operating unit when the operator turns on an ignition of the vehicle from outside of the vehicle and acts also as a start operating unit of a power source. Further, the ignition-off operating unit 56 is an operating unit when the operator turns off the ignition of the vehicle from outside of the vehicle and acts also as a stop operating unit of the power source.

In the case, after the operator has moved the vehicle to a desired position by the outside-of-vehicle operation, the operator transmits an ignition-off signal by operating the ignition-off operating unit 56. On receiving the ignition-off signal via a communication device 13a of a communication ECU 13, the drive assist controller carries out ignition-off control and stops the power source. At the time, regardless that a range operating unit is operated in a parking range, the drive assist controller controls a shift by wire device 61 and operates a parking mechanism of an automatic transmission so that the vehicle cannot move while it is at rest.

In contrast, also when, for example, the vehicle moves from a parking area, the vehicle control systems 1 and 2 can carry out the drive assist from outside of the vehicle. For example, the operator transmits an ignition-on signal by operating the ignition-on operating unit 55. On receiving the ignition-on signal via the communication device 13a, the communication ECU 13 transmits an instruction to a power supply management device 71 and resumes a power supply, which was stopped, to the drive assist ECU 11. With the operation, the drive assist controller of the drive assist ECU 11 carries out ignition-on control and starts the power source. Thereafter, the operator can also cause the vehicle at rest to travel from outside of the vehicle by operating a forward travel operating unit 51 and a rearward travel operating unit 52.

REFERENCE SIGNS LIST

1, 2 vehicle control system
11 drive assist ECU
21 assist instruction device
22 warning mode selection device
31 laser device
32 sonar device
33 image pick-up device
41 warning device
50 outside-of-vehicle operation device
61 shift by wire device
61a shift position sensor
62 parking brake switch
63 seat belt switch
64 door open/close switch
65 occupant detector
66 head light
67 horn

The invention claimed is:

1. A vehicle control system comprising:
an outside-of-vehicle operation device configured to cause a vehicle to travel operated by an operator from outside of the vehicle, wherein inside of a compartment of the vehicle is isolated from the outside of the vehicle by a vehicle body;
an assist instruction device configured to cause the operator to select a travel mode in which the vehicle is allowed to travel by an operation of the outside-of-vehicle operation device;
a parking brake operation detector configured to detect an operation of a parking brake; and
a warning device configured to issue a warning inside of the compartment to stimulate sense of hearing or sense of sight at the time the travel mode is selected and the operation of the parking brake is detected.

2. The vehicle control system according to claim 1, further comprising:
a vehicle getting-off-motion detector configured to detect a motion of the operator for getting off the vehicle from inside of the compartment to outside of the vehicle,
wherein the warning device further issues the warning at the time the motion of the operator for getting off the vehicle from inside of the compartment to outside of the vehicle is detected.

3. The vehicle control system according to claim 1, wherein, when the travel mode is selected, the warning device issues the warning at the time the operation of the parking brake is detected.

4. The vehicle control system according to claim 3, further comprising:
a vehicle getting-off-motion detector configured to detect the motion of the operator for getting off the vehicle from inside of the compartment to outside of the vehicle,
wherein, when the travel mode is selected and further the motion of the operator for getting off the vehicle from inside of the compartment to outside of the vehicle is detected, the warning device issues the warning at the time the operation of the parking brake is detected.

5. The vehicle control system according to claim 1, further comprising:
a vehicle getting-off detector configured to detect that the operator has gotten off the vehicle from inside of the compartment to outside of the vehicle,
wherein the warning device further issues the warning at the time it is not detected that the operator has gotten off the vehicle from inside of the compartment to outside of the vehicle.

6. The vehicle control system according to claim 1, further comprising:
a vehicle getting-off-motion detector configured to detect a motion of the operator for getting off the vehicle from inside of the compartment to outside of the vehicle,
wherein the warning device further issues the warning at the time the motion of the operator for getting off the vehicle from inside of the compartment to outside of the vehicle is not detected.

7. The vehicle control system according to claim 2, wherein a vehicle getting-off-motion determining unit that carries out a determination based on the result of detection of the vehicle getting-off-motion detector determines that the operator carries out a motion for getting off the vehicle from inside of the compartment to outside of the vehicle in at least any one of the cases that the vehicle getting-off-motion determining unit that detects (i) a change of a seat belt of a seat of the operator from a worn-state to a non-worn state, (ii) a change of a door through which the operator enters and exits from a closed-state to an open-state, (iii) a shift state of the operator from a sitting-state to a non-sitting state, and (iv) a shift position sensor detects an operation of a range operating unit to a parking range.

8. The vehicle control system according to claim 1, wherein the parking brake includes an operating unit that operates the parking brake mechanically coupled with a braking force generating unit that generates a braking force.

9. The vehicle control system according to claim 4, wherein a vehicle getting-off-motion determining unit that carries out a determination based on the result of detection of the vehicle getting-off-motion detector determines that the operator carries out a motion for getting off the vehicle from inside of the compartment to outside of the vehicle in at least any one of the cases that the vehicle getting-off-motion determining unit that detects (i) a change of a seat belt of a seat of the operator from a worn-state to a non-worn state, (ii) a change of a door through which the operator enters and exits from a closed-state to an open-state, (iii) a shift state of the operator from a sitting-state to a non-sitting state, and (iv) a shift position sensor detects an operation of a range operating unit to a parking range.

10. The vehicle control system according to claim 6, wherein a vehicle getting-off-motion determining unit that carries out a determination based on the result of detection of the vehicle getting-off-motion detector determines that the operator carries out a motion for getting off the vehicle from inside of the compartment to outside of the vehicle in at least any one of the cases that the vehicle getting-off-motion determining unit that detects (i) a change of a seat belt of a seat of the operator from a worn-state to a non-worn state, (ii) a change of a door through which the operator enters and exits from a closed-state to an open-state, (iii) a shift state of the operator from a sitting-state to a non-sitting state, and (iv) a shift position sensor detects an operation of a range operating unit to a parking range.

11. A vehicle control system comprising:
an outside-of-vehicle operation device configured to cause a vehicle to travel operated by an operator from outside of the vehicle, wherein inside of a compartment of the vehicle is isolated from the outside of the vehicle by a vehicle body;
an assist instruction device configured to cause the operator to select a travel mode in which the vehicle is allowed to travel by an operation of the outside-of-vehicle operation device;
a parking brake operation detector configured to detect an operation of a parking brake;
a vehicle getting-off detector configured to detect that the operator has gotten off the vehicle from inside of the compartment to outside of the vehicle; and
a warning device configured to issue a warning outside of the vehicle to stimulate sense of hearing or sense of sight at the time the travel mode is selected, the operation of the parking brake is detected, and it is detected that the operator has gotten off the vehicle from inside of the compartment to outside of the vehicle.

12. The vehicle control system according to claim 11, wherein the warning device issues the warning at the time the warning device receives the control signal from the outside-of-vehicle operation device, when the travel mode is selected, when the operation of the parking brake is detected, and when the operator has gotten off the vehicle from inside of the compartment to outside of the vehicle is detected.

13. The vehicle control system according to claim 11, wherein the parking brake includes an operating unit that operates the parking brake mechanically coupled with a braking force generating unit that generates a braking force.

14. A vehicle control system comprising:
an outside-of-vehicle operation device configured to cause a vehicle to travel operated by an operator from outside of the vehicle, wherein inside of a compartment of the vehicle is isolated from the outside of the vehicle by a vehicle body;
an assist instruction device configured to cause the operator to select a travel mode in which the vehicle is allowed to travel by an operation of the outside-of-vehicle operation device;
a parking brake operation detector configured to detect an operation of a parking brake;
a vehicle getting-off-motion detector configured to detect a motion of the operator for getting off the vehicle from inside of the compartment to outside of the vehicle;
a vehicle getting-off detector configured to detect that the operator has gotten off the vehicle from inside of the compartment to outside of the vehicle;
a warning mode selection device capable of selecting (i) a warning mode for issuing warning in the compartment to stimulate sense of hearing or sense of sight at the time the operation of the parking brake is detected when the travel mode is selected, (ii) a warning mode for issuing warning in the compartment to stimulate sense of hearing or sense of sight when the travel mode is selected, when the operation of the parking brake is detected, and when it is not detected that the operator has gotten off the vehicle from inside of the compartment to outside of the vehicle, (iii) a warning mode for issuing warning in the compartment to stimulate sense of hearing or sense of sight when the travel mode is selected, when the operation of the parking brake is detected, and when the motion of the operator for getting off the vehicle from inside of the compartment to outside of the vehicle is detected, and (iv) a warning mode for issuing warning outside of the vehicle to stimulate sense of hearing or sense of sight when the travel mode is selected, when the operation of the parking brake is detected, and when it is detected that the operator has gotten off the vehicle from inside of the compartment to outside of the vehicle, respectively; and
a warning device configured to issue the warning depending on the selected warning mode.

15. The vehicle control system according to claim 14, wherein a vehicle getting-off-motion determining unit that carries out a determination based on the result of detection of the vehicle getting-off-motion detector determines that the operator carries out a motion for getting off the vehicle from inside of the compartment to outside of the vehicle in at least any one of the cases that the vehicle getting-off-motion determining unit that detects (i) a change of a seat belt of a seat of the operator from a worn-state to a non-worn state, (ii) a change of a door through which the operator enters and exits from a closed-state to an open-state, (iii) a shift state of the operator from a sitting-state to a non-sitting state, and (iv) a shift position sensor detects an operation of a range operating unit to a parking range.

16. The vehicle control system according to claim 14, wherein the parking brake includes an operating unit that operates the parking brake mechanically coupled with a braking force generating unit that generates a braking force.

* * * * *